(12) United States Patent
Vogels et al.

(10) Patent No.: US 10,572,979 B2
(45) Date of Patent: Feb. 25, 2020

(54) DENOISING MONTE CARLO RENDERINGS USING MACHINE LEARNING WITH IMPORTANCE SAMPLING

(71) Applicants: PIXAR, Emeryville, CA (US); Disney Enterprises, Inc., Burbank, CA (US)

(72) Inventors: Thijs Vogels, Lausanne (CH); Fabrice Rousselle, Ostermundingen (CH); Brian McWilliams, Zürich (CH); Mark Meyer, Davis, CA (US); Jan Novak, Meilen (CH)

(73) Assignees: Pixar, Emeryville, CA (US); Disney Enterprises, Inc., Burbank, CA (US)

( * ) Notice: Subject to any disclaimer, the term of this patent is extended or adjusted under 35 U.S.C. 154(b) by 84 days.

(21) Appl. No.: 15/946,654

(22) Filed: Apr. 5, 2018

(65) Prior Publication Data

US 2018/0293713 A1    Oct. 11, 2018

Related U.S. Application Data

(60) Provisional application No. 62/482,596, filed on Apr. 6, 2017, provisional application No. 62/650,106, filed on Mar. 29, 2018.

(51) Int. Cl.
G06K 9/62    (2006.01)
G06T 5/00    (2006.01)
(Continued)

(52) U.S. Cl.
CPC .............. G06T 5/002 (2013.01); G06K 9/623 (2013.01); G06K 9/6257 (2013.01);
(Continued)

(58) Field of Classification Search
CPC .......... G06T 5/002; G06T 2207/20084; G06T 2207/20192; G06T 2207/20081;
(Continued)

(56) References Cited

U.S. PATENT DOCUMENTS 8,542,898 B2   9/2013   Bathe et al.
10,311,552 B2  6/2019   Meyer et al.
(Continued)

OTHER PUBLICATIONS

M. Zwicker et al., "Recent Advances in Adaptive Sampling and Reconstruction for Monte Carlo Rendering", Computer Graphics Forum c 2015 The Eurographics Association and John Wiley & Sons Ltd, vol. 34 (2015), No. 2, pp. 667-681.*
(Continued)

Primary Examiner — Samir A Ahmed
(74) Attorney, Agent, or Firm — Kilpatrick Townsend & Stockton LLP

(57) ABSTRACT

Supervised machine learning using neural networks is applied to denoising images rendered by MC path tracing. Specialization of neural networks may be achieved by using a modular design that allows reusing trained components in different networks and facilitates easy debugging and incremental building of complex structures. Specialization may also be achieved by using progressive neural networks. In some embodiments, training of a neural-network based denoiser may use importance sampling, where more challenging patches or patches including areas of particular interests within a training dataset are selected with higher probabilities than others. In some other embodiments, generative adversarial networks (GANs) may be used for training a machine-learning based denoiser as an alternative to using pre-defined loss functions.

20 Claims, 17 Drawing Sheets

(51) Int. Cl.
| | |
|---|---|
| *G06T 5/50* | (2006.01) |
| *G06N 3/08* | (2006.01) |
| *G06N 3/04* | (2006.01) |
| *G06T 7/00* | (2017.01) |
| *G06T 15/06* | (2011.01) |
| *G06T 7/90* | (2017.01) |

(52) U.S. Cl.
CPC ............ *G06K 9/6298* (2013.01); *G06N 3/04* (2013.01); *G06N 3/0454* (2013.01); *G06N 3/08* (2013.01); *G06N 3/084* (2013.01); *G06T 5/50* (2013.01); *G06T 7/0002* (2013.01); *G06T 7/90* (2017.01); *G06T 15/06* (2013.01); *G06T 2207/20076* (2013.01); *G06T 2207/20081* (2013.01); *G06T 2207/20084* (2013.01); *G06T 2207/30168* (2013.01); *G06T 2207/30201* (2013.01)

(58) Field of Classification Search
CPC .... G06N 3/0454; G06N 3/084; G06N 3/0472; G06K 9/6298; G06K 9/6257; G06K 9/0051; G06K 9/627; G06K 9/4628
USPC .......................... 382/275, 254, 156, 157, 158
See application file for complete search history.

(56) References Cited

U.S. PATENT DOCUMENTS

| | | | |
|---|---|---|---|
| 2010/0044571 | A1 | 2/2010 | Miyaoka et al. |
| 2012/0135874 | A1 | 5/2012 | Wang et al. |
| 2016/0269723 | A1* | 9/2016 | Zhou ........................ G06T 15/06 |
| 2016/0321523 | A1 | 11/2016 | Sen et al. |
| 2017/0091982 | A1* | 3/2017 | Engel ...................... G06T 15/08 |
| 2017/0109925 | A1* | 4/2017 | Gritzky ................... G06T 17/20 |
| 2017/0256090 | A1 | 9/2017 | Zhou et al. |
| 2017/0365089 | A1 | 12/2017 | Mitchell et al. |
| 2018/0114096 | A1* | 4/2018 | Sen .......................... G06T 5/002 |
| 2018/0158233 | A1* | 6/2018 | Wyman ................. G06T 15/503 |
| 2018/0165554 | A1 | 6/2018 | Zhang et al. |
| 2018/0204314 | A1 | 7/2018 | Kaplanyan et al. |

OTHER PUBLICATIONS

Manolis Papadrakakis etal., "Reliability-based structural optimization using neural networks and Monte Carlo simulation",Comput. Methods Appl. Mech. Engrg. 191 (2002), pp. 3491-3507.*

Fabrice Rousselle et al., "Robust Denoising using Feature and Color Information", Computer Graphics Forum c 2013 The Eurographics Association and John Wiley & Sons Ltd. Published by John Wiley & Sons Ltd, vol. 32 (2013), No. 7, pp. 121-130.*

Steve Bako et al., "Kernel-Predicting Convolutional Networks for Denoising Monte Carlo Renderings",ACM Transactions on Graphics, vol. 36, No. 4, Article 97. Publication date: Jul. 2017, pp. 97:1-97-14.*

Naran M. Pindoriya et al. "Composite Reliability Evaluation Using Monte Carlo Simulation and Least Squares Support Vector Classifier",IEEE Transactions on Power Systems, vol. 26, No. 4, Nov. 2011, pp. 2483-2490.*

Bako et al., "Removing Shadows from Images of Documents", Proceedings of ACCV 2016, Available Online at http://cvc.ucsb.edu/graphics/Papers/ACCV2016_DocShadow/, 2016.

Kalantari et al., "A Machine Learning Approach for Filtering Monte Carlo Noise", ACM Transactions on Graphics, vol. 34, No. 4, Proceedings of ACM SIGGRAPH 2015, Aug. 2015, 12 pages.

Szegedy et al., "Going Deeper with Convolutions", Available Online at https://www.cs.unc.edu/~wliu/papers/GoogLeNet.pdf, pp. 1-9.

Xie et al., "Image Denoising and Inpainting with Deep Neural Networks", Available Online at https://papers.nips.cc/paper/4686-image-denoising-and-inpainting-with-deep-neural-networks.pdf, pp. 1-9.

Xu , "Deep Edge-Aware Filters", Proceedings of the 32nd International Conference on Machine Learning, Lille, France, vol. 37, Available Online at http://www.cs.toronto.edu/~rjliao/papers/ICML_2015_Deep.pdf, 2015, 10 pages.

U.S. Appl. No. 15/946,649, filed Apr. 5, 2018, 80 pages.
U.S. Appl. No. 15/946,652, filed Apr. 5, 2018, 83 pages.
U.S. Appl. No. 15/630,478, "Notice of Allowance", dated Mar. 19, 2019, 14 pages.
U.S. Appl. No. 16/050,314, filed Jul. 31, 2018, 102 pages.
U.S. Appl. No. 16/050,332, filed Jul. 31, 2018, 103 pages.
U.S. Appl. No. 16/050,336, filed Jul. 31, 2018, 100 pages.
U.S. Appl. No. 16/050,362, filed Jul. 31, 2018, 100 pages.
Liu, "Machine Learning for Filtering Monte Carlo Noise in Ray Traced Images", Department of Computing, Imperial College London, Jun. 21, 2017, 66 pages.

Luongo et al., "Investigating Machine Learning for Monte-Carlo Noise Removal in Rendered Images", Summer School on Semisupervised Learning. DTU Compute.Liselund M0de-og Kursussted, Slagelse, Denmark, Aug. 8, 2016.

U.S. Appl. No. 15/946,649, "Notice of Allowance", dated Oct. 25, 2019, 9 pages.

Zhang et al., "SeqGAN: Sequence Generative Adversarial Nets with Policy Gradient", Proceedings of the Thirty-First AAAI Conference on Artificial Intelligence (AAAI-17), 2017, pp. 2852-2858.

* cited by examiner

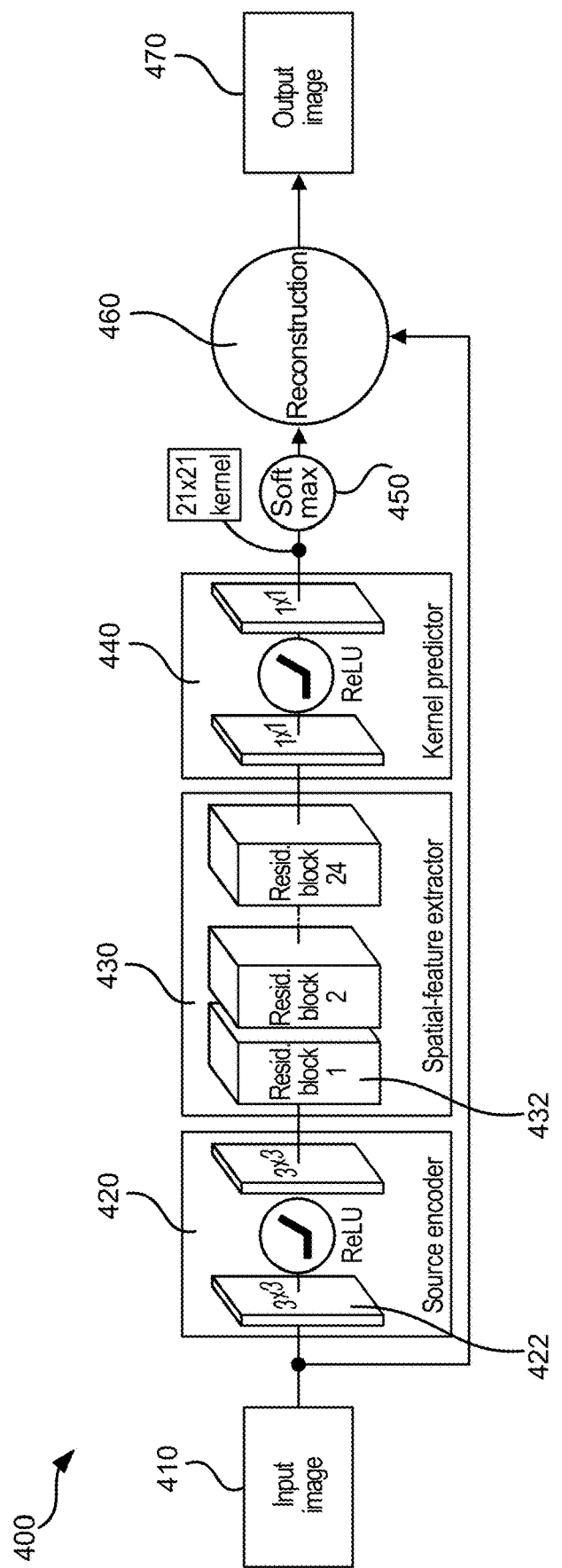
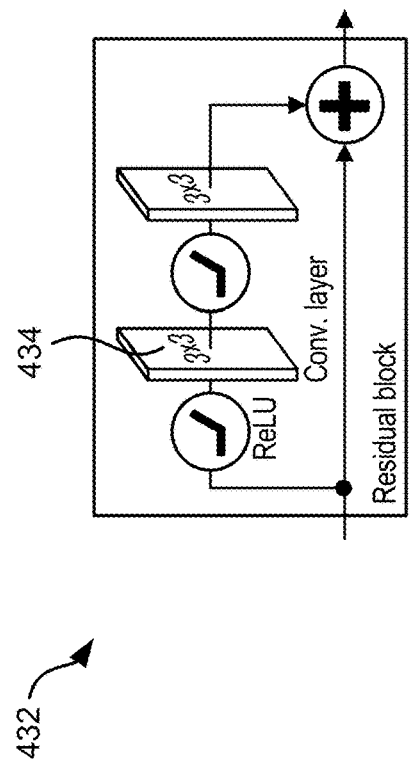
FIG. 4A
FIG. 4B

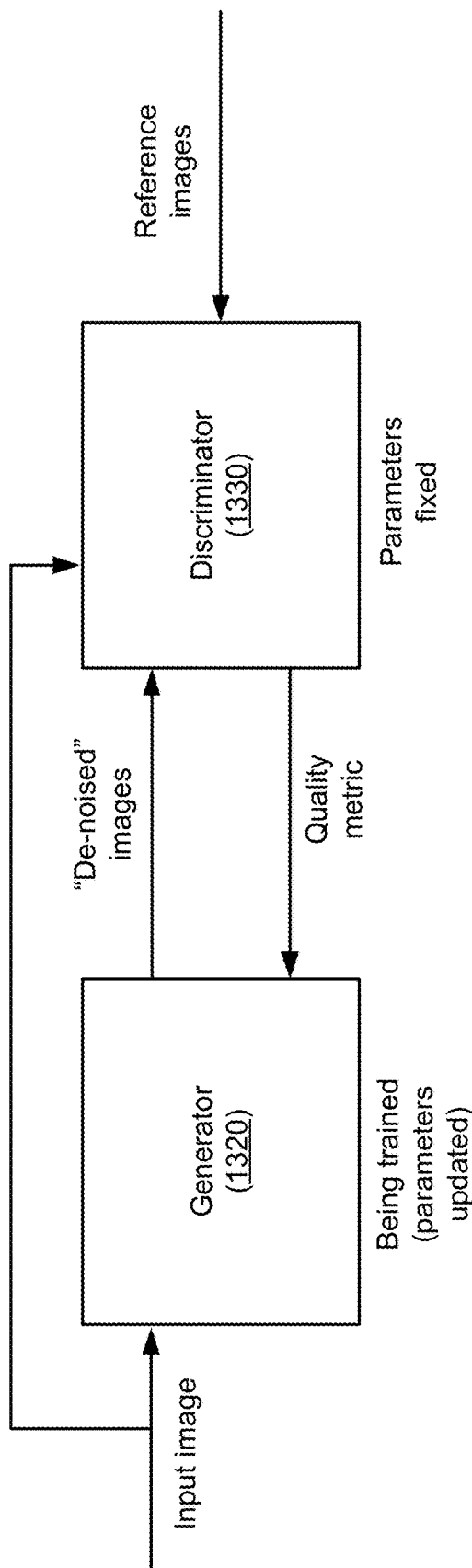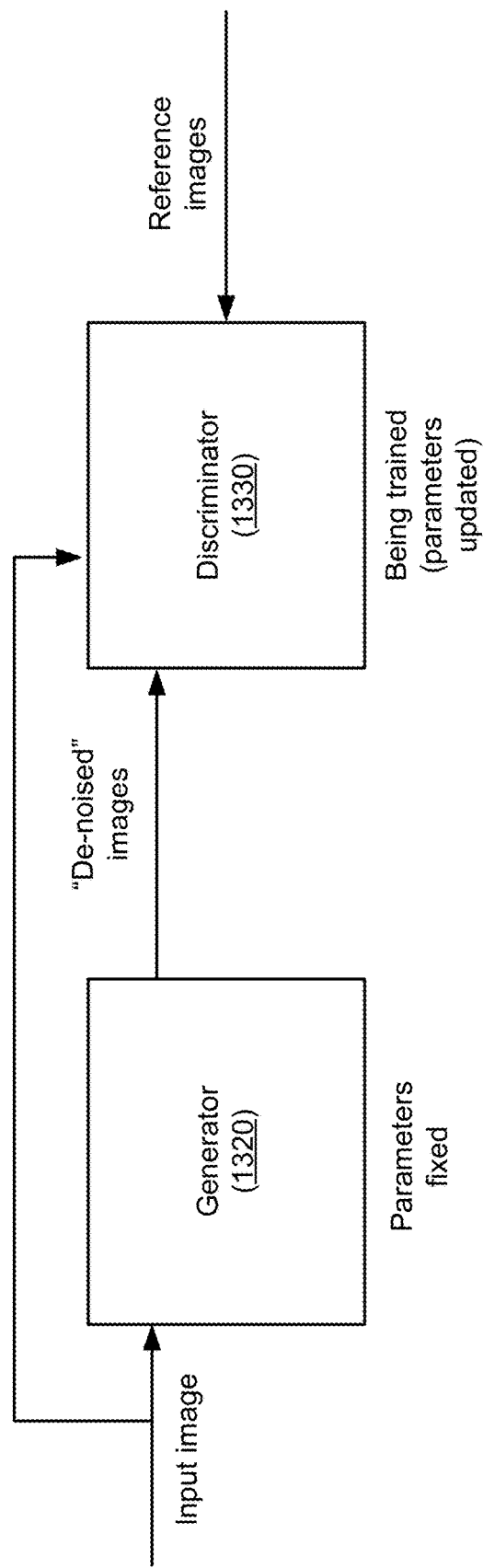

DENOISING MONTE CARLO RENDERINGS USING MACHINE LEARNING WITH IMPORTANCE SAMPLING

CROSS-REFERENCES TO RELATED APPLICATION

The present application is a non-provisional application of and claims the benefit and priority under 35 U.S.C. 119(e) of U.S. Provisional Patent Application No. 62/482,596, filed Apr. 6, 2017, entitled "TECHNIQUES FOR DENOISING AND UPSAMPLING USING MACHINE LEARNING," and U.S. Provisional Patent Application No. 62/650,106, filed Mar. 29, 2018, entitled "MODULAR APPROACHES FOR DENOISING MONTE CARLO RENDERINGS USING CONVOLUTIONAL NEURAL NETWORKS," the entire contents of which are incorporated herein by reference for all purposes.

The following three U.S. patent Applications (including this one) are being filed concurrently, and the entire disclosures of the other applications are incorporated by reference into this application for all purposes:

Application Ser. No. 15/946,649, filed Apr. 5, 2018, entitled "DENOISING MONTE CARLO RENDERINGS USING GENERATIVE ADVERSARIAL NEURAL NETWORKS";

Application Ser. No. 15/946,652, filed Apr. 5, 2018, entitled "DENOISING MONTE CARLO RENDERINGS USING PROGRESSIVE NEURAL NETWORKS"; and Application Ser. No. 15/946,654, filed Apr. 5, 2018, entitled "DENOISING MONTE CARLO RENDERINGS USING MACHINE LEARNING WITH IMPORTANCE SAMPLING".

BACKGROUND

Monte Carlo (MC) path tracing is a technique for rendering images of three-dimensional scenes by tracing paths of light through pixels on an image plane. This technique is capable of producing high quality images that are nearly indistinguishable from photographs. In MC path tracing, the color of a pixel is computed by randomly sampling light paths that connect the camera to light sources through multiple interactions with the scene. The mean intensity of many such samples constitutes a noisy estimate of the total illumination of the pixel. Unfortunately, in realistic scenes with complex light transport, these samples might have large variance, and the variance of their mean only decreases linearly with respect to the number of samples per pixel. Typically, thousands of samples per pixel are required to achieve a visually converged rendering. This can result in prohibitively long rendering times. Therefore, there is a need to reduce the number of samples needed for MC path tracing while still producing high-quality images.

SUMMARY

Supervised machine learning using neural networks is applied to denoising images rendered by MC path tracing. Specialization of neural networks may be achieved by using a modular design that allows reusing trained components in different networks and facilitates easy debugging and incremental building of complex structures. Specialization may also be achieved by using progressive neural networks. In some embodiments, training of a neural-network based denoiser may use importance sampling, where more challenging patches or patches including areas of particular interests within a training dataset are selected with higher probabilities than others. In some other embodiments, generative adversarial networks (GANs) may be used for training a machine-learning based denoiser as an alternative to using pre-defined loss functions.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 4A illustrates an exemplary neural network for denoising an MC rendered image using a modular approach according to some embodiments of the present invention.

FIG. 4B illustrates an exemplary residual block shown in FIG. 4A according to some embodiments of the present invention.

FIGS. 14A and 14B illustrate exemplary procedures of training a denoiser based on generative adversarial networks according to some embodiments of the present invention.

DETAILED DESCRIPTION

Figure 1:
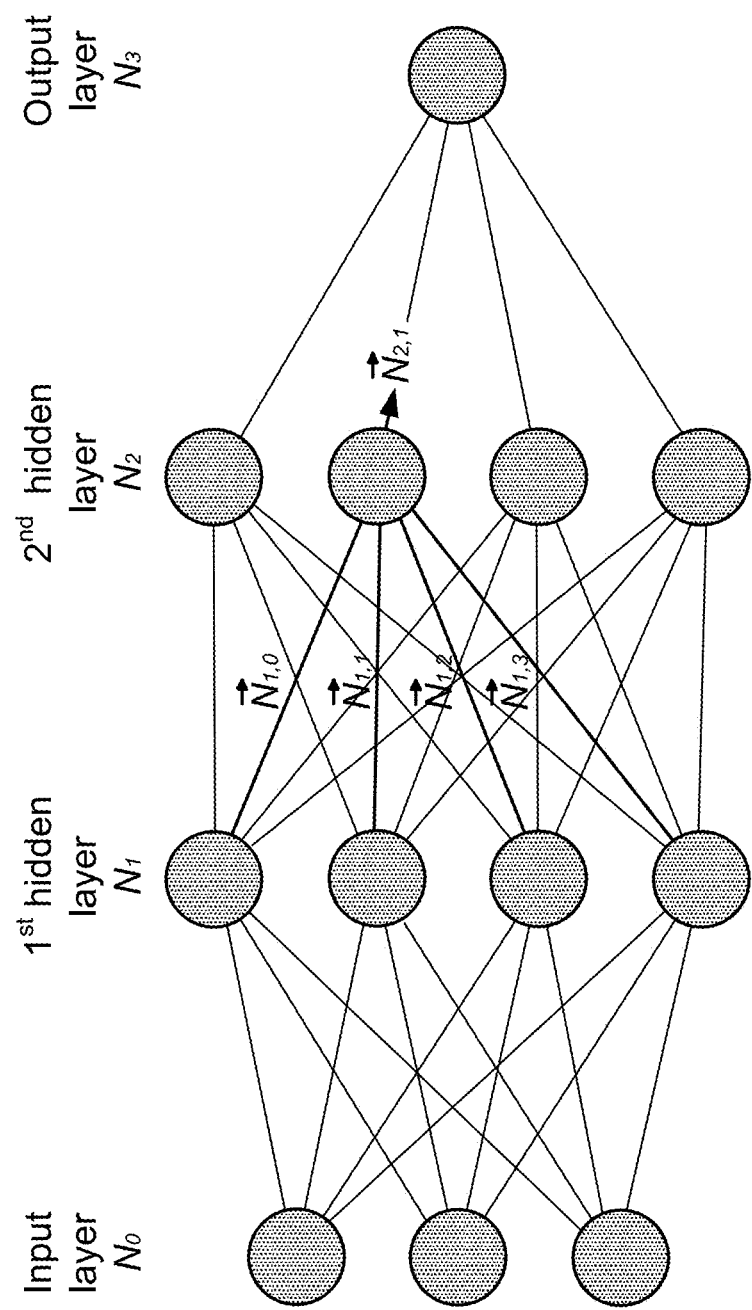
FIG. 1 illustrates an exemplary neural network according to some embodiments.

In recent years, physically-based image synthesis has become widespread in feature animation and visual effects. Fueled by the desire to produce photorealistic imagery, many production studios have switched their rendering algorithms from REYES-style micropolygon architectures to physically-based Monte Carlo (MC) path tracing. While MC rendering algorithms can satisfy high quality requirements, they do so at a significant computational cost and with convergence characteristics that require long rendering times for nearly noise-free images, especially for scenes with complex light transport.

Recent postprocess, image-space, general MC denoising algorithms have demonstrated that it is possible to achieve high-quality results at considerably reduced sampling rates (see Zwicker et al., Recent Advances in Adaptive Sampling and Reconstruction for Monte Carlo Rendering. 34, 2 (May 2015), 667-681, and Sen et al., Denoising Your Monte Carlo Renders: Recent Advances in Image Space Adaptive Sampling and Reconstruction. In ACM SIGGRAPH 2015 Courses. ACM, 11, for an overview), and commercial renderers are now incorporating these techniques. For example, VRay renderer, the Corona renderer, and Pixar's RenderMan now ship with integrated denoisers. Moreover, many production houses are developing their own internal solutions or using third-party tools (e.g., the Altus denoiser). Most existing image-space MC denoising approaches use a regression framework.

Recently, it has been demonstrated that denoisers employing convolutional neural networks (CNN) can perform on par or outperform the zero- and first-order regression models under certain circumstances. However, there are several issues with neural networks—in particular with regards to data efficiency during training and domain adaptation during inference—which limit their broad application. Data-efficiency of deep learning remains a significant challenge with larger neural networks requiring enormous training datasets to produce good results. This may pose a particular problem for denoising MC path tracing renderings, since generating ground-truth renders to be used as targets for prediction in the supervised-learning framework is extremely computationally expensive. This issue impacts several areas including training and adaptation to data from different sources.

Embodiments of the present invention provide several solutions to overcome or mitigate these problems faced by machine-learning based denoisers. Embodiments include a modular design that allows reusing trained components in different networks and facilitates easy debugging and incremental building of complex structures. In some embodiments, parts of a trained neural network may serve as low-level building blocks for novel tasks. A modular architecture may permit constructing large networks that would be difficult to train as monolithic blocks due to large memory requirements or training instability. In some embodiments, specialization may be achieved by using a progressive neural network, where a first column of a neural network may be trained on a first training dataset. When switching to a second training dataset, the parameters of the first column are "frozen" so that they will not be "forgotten," and a second column is instantiated. The parameters of the first column may be laterally transferred to the second column. In some embodiments, the first training dataset may be relatively large, whereas the second training dataset can be relatively small.

Embodiments also include training a neural-network based denoiser using importance sampling, where more challenging patches within a training dataset are selected with higher probabilities than others. The sampling probabilities can depend on some image metrics, such as average pixel color variance within a patch, variance of surface normals within a patch, presence of edges in the image, variance of the effective diffuse irradiance (which can be obtained by dividing out the surface albedo from the surface diffuse color), and the like. In some other embodiments, importance sampling may be used to achieve faster convergence, where patches with larger error gradients are sampled with higher probabilities. In some further embodiments, importance sampling may be used for biased training, where training patches including areas of particular interests are sampled with higher probabilities.

Embodiments also use generative adversarial networks (GANs) for training a machine-learning based denoiser as an alternative to using pre-defined loss functions. The training may involve simultaneously optimizing two models: a generator or denoiser that captures data distribution, and a discriminator that estimates the probability that a sample belongs to the class of ground truth images rather than the class of denoised images. The training procedure for the generator is to maximize the probability of the discriminator making a mistake. Such a training procedure may eliminate the need for carefully choosing a loss function, and may yield results that are sharper and more perceptually pleasing than those achieved with hand-picked loss functions.

I. Rendering Using Monte Carlo Path Tracing

Path tracing is a technique for presenting computer-generated scenes on a two-dimensional display by tracing a path of a ray through pixels on an image plane. The technique can produce high-quality images, but at a greater computational cost. In some examples, the technique can include tracing a set of rays to a pixel in an image. The pixel can be set to a color value based on the one or more rays. In such examples, a set of one or more rays can be traced to each pixel in the image. However, as the number of pixels in an image increases, the computational cost also increases.

In a simple example, when a ray reaches a surface in a computer-generated scene, the ray can separate into one or more additional rays (e.g., reflected, refracted, and shadow rays). For example, with a perfectly specular surface, a reflected ray can be traced in a mirror-reflection direction from a point corresponding to where an incoming ray reaches the surface. The closest object that the reflected ray intersects can be what will be seen in the reflection. As another example, a refracted ray can be traced in a different direction than the reflected ray (e.g., the refracted ray can go into a surface). For another example, a shadow ray can be traced toward each light. If any opaque object is found between the surface and the light, the surface can be in shadow and the light may not illuminate the surface. However, as the number of additional rays increases, the computational costs for path tracing increases even further. While a few types of rays have been described that affect computational cost of path tracing, it should be recognized that there can be many other variables that affect computational cost of determining a color of a pixel based on path tracing.

In some examples, rather than randomly determining which rays to use, a bidirectional reflectance distribution function (BRDF) lobe can be used to determine how light is reflected off a surface. In such examples, when a material is more diffuse and less specular, the BRDF lobe can be wider, indicating more directions to sample. When more sampling directions are required, the computation cost for path tracing may increase.

In path tracing, the light leaving an object in a certain direction is computed by integrating all incoming and generated light at that point. The nature of this computation is recursive, and is governed by the rendering equation:

$$L_o(\vec{x},\vec{\omega}_o)=L_e(\vec{x},\vec{\omega}_o)+\int_\Omega f_r(\vec{x},\vec{\omega}_i,\vec{\omega}_o)L_i(\vec{x},\vec{\omega}_i)(\vec{\omega}_i\cdot\vec{n})d\vec{\omega}_i, \quad (1)$$

where $L_o$ represents the total radiant power transmitted from an infinitesimal region around a point $\vec{x}$ into an infinitesimal cone in the direction $\vec{\omega}_o$. This quantity may be referred to as "radiance." In equation (1), $L_e$ is the emitted radiance (for light sources), $\vec{n}$ is the normal direction at position $\vec{x}$, $\Omega$ is the unit hemisphere centered around $\vec{n}$ containing all possible values for incoming directions $\vec{\omega}_i$, and $L_i$ represents the incoming radiance from $\vec{\omega}_i$. The function $f_r$ is referred to as the bidirectional reflectance distribution function (BRDF). It captures the material properties of an object at $\vec{x}$.

The recursive integrals in the rendering equation are usually evaluated using a MC approximation. To compute the pixel's color, light paths are randomly sampled throughout the different bounces. The MC estimate of the color of a pixel i may be denoted as the mean of n independent samples $p_{i,k}$ from the pixel's sample distribution $\mathbb{S}_i$ as follows, $$\bar{p}_i = \frac{1}{n}\sum_{k=1}^{n} p_{i,k}, \quad p_{i,k}\sim\mathbb{S}_i \forall\ i\in[1,n]. \quad (2)$$

The MC approximated $\bar{p}_i$ is an unbiased estimate for the converged pixel color mean $\tilde{p}_i$ that would be achieved with an infinite number of samples:

$$\tilde{p}_i = \lim_{n\to\infty}\frac{1}{n}\sum_{k=1}^{n} p_{i,k}. \quad (3)$$

In unbiased path tracing, the mean of $\mathbb{S}_i$ equals $\tilde{p}_i$, and its variance depends on several factors. One cause might be that light rays sometimes just hit an object, and sometimes just miss it, or that they sometimes hit a light source, and sometimes not. This makes scenes with indirect lighting and many reflective objects particularly difficult to render. In these cases, the sample distribution is very skewed, and the samples $p_{i,k}$ can be orders of magnitude apart.

The variance of the MC estimate $\bar{p}_i$ based on n samples, follows from the variance of $\mathbb{S}_i$ as $$\text{Var}[\bar{p}_i] = \frac{1}{n}\text{Var}[\mathbb{S}_i]. \quad (4)$$

Because the variance decreases linearly with respect to n, the expected error $\sqrt{\text{Var}[\bar{p}_i]}$ decreases as $1/\sqrt{n}$.

II. Image-Space Denoising

To deal with the slow convergence of MC renderings, several denoising techniques have been proposed to reduce the variance of rendered pixel colors by leveraging spatial redundancy in images. Most existing denoisers estimate $\hat{p}_i$ by a weighted sum of the observed pixels $\bar{p}_k$ in a region of pixels around pixel i:

$$\hat{p}_i = \sum_{k\in\mathcal{R}_i} \bar{p}_k w(i,k), \quad (5)$$

where $\mathcal{R}_i$ is a region (e.g. a square region) around pixel i and $\sum_{k\in\mathcal{R}_i} w(i,k)=1$. The weights $w(i,k)$ follow from different kinds of weighted regressions on $\mathcal{R}_i$.

Most existing denoising methods build on the idea of using generic non-linear image-space filters and auxiliary feature buffers as a guide to improve the robustness of the filtering process. One important development was to leverage noisy auxiliary buffers in a joint bilateral filtering scheme, where the bandwidths of the various auxiliary features are derived from the sample statistics. One application of these ideas was to use the non-local means filter in a joint filtering scheme. The appeal of the non-local means filter for denoising MC renderings is largely due to its versatility.

Recently, it was shown that joint filtering methods, such as those discussed above, can be interpreted as linear regressions using a zero-order model, and that more generally most state-of-the-art MC denoising techniques are based on a linear regression using a zero- or first-order model. Methods leveraging a first-order model have proved to be very useful for MC denoising, and while higher-order models have also been explored, it must be done carefully to prevent overfitting to the input noise.

III. Machine Learning and Neural Networks

A. Machine Learning

In supervised machine learning, the aim may be to create models that accurately predict the value of a response variable as a function of explanatory variables. Such a relationship is typically modeled by a function that estimates the response variable y as a function $\hat{y}=f(\vec{x},\vec{w})$ of the explanatory variables $\vec{x}$ and tunable parameters $\vec{w}$ that are adjusted to make the model describe the relationship accurately. The parameters $\vec{w}$ are learned from data. They are set to minimize a cost function or loss function $L(\mathcal{D}_{train},\vec{w})$ (also referred herein as error function) over a training set $\mathcal{D}_{train}$, which is typically the sum of errors on the entries of the dataset:

$$L(\mathcal{D}_{train},\vec{w}) = \frac{1}{|\mathcal{D}_{train}|}\sum_{(\vec{x}_i,\hat{y}_i)\in\mathcal{D}_{train}} l(\hat{y}_i, f(\vec{x}_i,\vec{w})), \quad (6)$$

where l is a per-element loss function. The optimal parameters may satisfy $$\vec{w} = \operatorname*{argmin}_{\vec{w}} L(\mathcal{D}_{train},\vec{w}). \quad (7)$$

Typical loss functions for continuous variables are the quadratic or $L_2$ loss $l_2(y,\hat{y})=(y-\hat{y})^2$ and the $L_1$ loss $l_1(y,\hat{y})=|y-\hat{y}|$.

Common issues in machine learning may include overfitting and underfitting. In overfitting, a statistical model describes random error or noise in the training set instead of the underlying relationship. Overfitting occurs when a model is excessively complex, such as having too many parameters relative to the number of observations. A model that has been overfit has poor predictive performance, as it overreacts to minor fluctuations in the training data. Underfitting occurs when a statistical model or machine learning algorithm cannot capture the underlying trend of the data. Underfitting would occur, for example, when fitting a linear model to non-linear data. Such a model may have poor predictive performance.

To control over-fitting, the data in a machine learning problem may be split into three disjoint subsets: the training set $\mathcal{D}_{train}$, a test set $\mathcal{D}_{test}$, and a validation set $\mathcal{D}_{val}$. After a model is optimized to fit $\mathcal{D}_{train}$, its generalization behavior can be evaluated by its loss on $\mathcal{D}_{test}$. After the best model is selected based on its performance on $\mathcal{D}_{test}$, it is ideally re-evaluated on a fresh set of data $\mathcal{D}_{val}$.

B. Neural Networks

Neural networks are a general class of models with potentially large numbers of parameters that have shown to be very useful in capturing patterns in complex data. The model function $f$ of a neural network is composed of atomic building blocks called "neurons" or nodes. A neuron $n_i$ has inputs $\vec{x}_i$ and an scalar output value $y_i$, and it computes the output as $$y_i = n_i(\vec{x}_i, \vec{w}_i) = \phi_i(\vec{x}_i \cdot \vec{w}_i), \quad (8)$$

where $\vec{w}_i$ are the neuron's parameters and $\vec{x}_i$ is augmented with a constant feature. $\phi$ is a non-linear activation function that ensures a composition of several neurons can be non-linear. Activation functions can include hyperbolic tangent $\tan h(x)$, sigmoid function $\phi_{sigmoid}(x) = (1 + \exp(-x))^{-1}$, and the rectified linear unit (ReLU) $\phi_{ReLU}(x) = \max(x, 0)$.

A neural network is composed of layers of neurons. The input layer $N_0$ contains the model's input data $\vec{x}$, and the neurons in the output layer predict an output $\hat{\vec{y}}$. In a fully connected layer $N_k$, the inputs of a neuron are the outputs of all neurons in the previous layer $N_{k-1}$.

FIG. 1 illustrates an exemplary neural network, in which neurons are organized into layers. $\vec{N}_k$ denotes a vector containing the outputs of all neurons $n_i$ in a layer k>0. The input layer $\vec{N}_0$ contains the model's input features $\vec{x}$. The neurons in the output layer return the model prediction $\hat{\vec{y}}$. The outputs of the neurons in each layer k form the input of layer k+1.

The activity of a layer $N_i$ of a fully-connected feed forward neural network can be conveniently written in matrix notation:

$$\vec{N}_0 = \hat{x}, \quad (9)$$

$$\vec{N}_k = \phi_k(W_k \vec{N}_{k-1}) \forall k \in [1, n), \quad (10)$$

where $W_k$ is a matrix that contains the model parameters $\vec{w}_j$ for each neuron in the layer as rows. The activation function $\phi_k$ operates element wise on its vector input.

1. Multilayer Perceptron Neural Networks

There are different ways in which information can be processed by a node, and different ways of connecting the nodes to one another. Different neural network structures, such as multilayer perceptron (MLP) and convolutional neural network (CNN), can be constructed by using different processing elements and/or connecting the processing elements in different manners.

FIG. 1 illustrates an example of a multilayer perceptron (MLP). As described above generally for neural networks, the MLP can include an input layer, one or more hidden layers, and an output layer. In some examples, adjacent layers in the MLP can be fully connected to one another. For example, each node in a first layer can be connected to each node in a second layer when the second layer is adjacent to the first layer. The MLP can be a feedforward neural network, meaning that data moves from the input layer to the one or more hidden layers and to the output layer when receiving new data.

The input layer can include one or more input nodes. The one or more input nodes can each receive data from a source that is remote from the MLP. In some examples, each input node of the one or more input nodes can correspond to a value for a feature of a pixel. Exemplary features can include a color value of the pixel, a shading normal of the pixel, a depth of the pixel, an albedo of the pixel, or the like. In such examples, if an image is 10 pixels by 10 pixels, the MLP can include 100 input nodes multiplied by the number of features. For example, if the features include color values (e.g., red, green, and blue) and shading normal (e.g., x, y, and z), the MLP can include 600 input nodes (10×10×(3+3)).

A first hidden layer of the one or more hidden layers can receive data from the input layer. In particular, each hidden node of the first hidden layer can receive data from each node of the input layer (sometimes referred to as being fully connected). The data from each node of the input layer can be weighted based on a learned weight. In some examples, each hidden layer can be fully connected to another hidden layer, meaning that output data from each hidden node of a hidden layer can be input to each hidden node of a subsequent hidden layer. In such examples, the output data from each hidden node of the hidden layer can be weighted based on a learned weight. In some examples, each learned weight of the MLP can be learned independently, such that a first learned weight is not merely a duplicate of a second learned weight.

A number of nodes in a first hidden layer can be different than a number of nodes in a second hidden layer. A number of nodes in a hidden layer can also be different than a number of nodes in the input layer (e.g., as in the neural network illustrated in FIG. 1).

A final hidden layer of the one or more hidden layers can be fully connected to the output layer. In such examples, the final hidden layer can be the first hidden layer or another hidden layer. The output layer can include one or more output nodes. An output node can perform one or more operations described above (e.g., non-linear operations) on data provided to the output node to produce a result to be provided to a system remote from the MLP.

2. Convolutional Neural Networks

In a fully connected layer, the number of parameters that connect the layer with the previous one is the product of the number of neurons in the layers. When a color image of size w×h×3 is the input of such a layer, and the layer has a similar number of output-neurons, the number of parameters can quickly explode and become infeasible as the size of the image increases.

Figure 2:
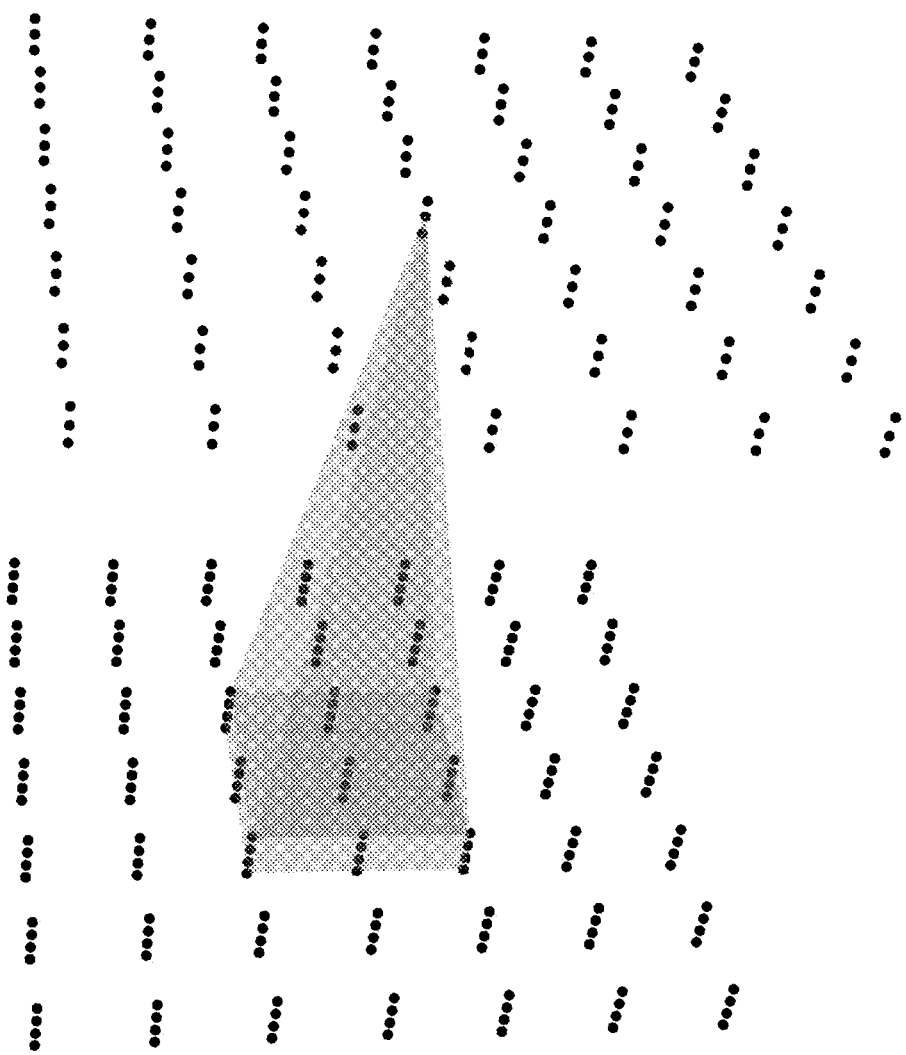
FIG. 2 illustrates an exemplary convolutional network (CNN) according to some embodiments.

To make neural networks for image processing more tractable, convolutional neural networks (CNNs) may simplify the fully connected layer by making the connectivity of neurons between two adjacent layers sparse. FIG. 2 illustrates an exemplary CNN layer where neurons are conceptually arranged into a three-dimensional structure. The first two dimensions follow the spatial dimensions of an image, and the third dimension contains a number of neurons (may be referred to as features or channels) at each pixel location. The connectivity of the nodes in this structure is local. Each of a layer's output neurons is connected to all input neurons in a spatial region centered around it. The size of this region, $k_x \times k_y$, is referred to as the kernel size. The network parameters used in these regions are shared over the spatial dimensions, bringing the number of free parameters down to $d_{in} \times k_x \times k_y \times d_{out}$, where $d_{in}$ and $d_{out}$ are the number of features per pixel in the previous layer and the current layer, respectively. The number $d_{out}$ is referred to as the number of channels or features in the layer.

In recent years, CNNs have emerged as a popular model in machine learning. It has been demonstrated that CNNs can achieve state-of-the-art performance in a diverse range of tasks such as image classification, speech processing, and many others. CNNs have also been used a great deal for a variety of low-level image-processing tasks. In particular, several works have considered the problem of natural image denoising and the related problem of image super-resolution.

IV. Denoising Using Neural Networks

According to some embodiments of the present invention, techniques based on machine learning, and more particularly based on neural networks, are used to denoise Monte Carlo path tracing renderings. The techniques disclosed herein may use the same inputs used in conventional denoising techniques based on linear regression or zero-order and higher-order regressions. The inputs may include, for example, pixel color and its variance, as well as a set of auxiliary buffers (and their corresponding variances) that encode scene information (e.g., surface normal, albedo, depth, and the like).

A. Modeling Framework

Before introducing the denoising framework, some mathematical notations may be defined as follows. The samples output by a typical MC renderer can be averaged down into a vector of per-pixel data, $$x_p = \{c_p, f_p\}, \text{ where } x_p \in \mathbb{R}^{3+D}, \quad (11)$$

where, $c_p$ represents the red, green and blue (RGB) color channels, and $f_p$ is a set of D auxiliary features (e.g., the variance of the color feature, surface normals, depth, albedo, and their corresponding variances).

The goal of MC denoising may be defined as obtaining a filtered estimate of the RGB color channels $\hat{c}_p$ for each pixel p that is as close as possible to a ground truth result $\bar{c}_p$ that would be obtained as the number of samples goes to infinity. The estimate of $\hat{c}_p$ may be computed by operating on a block $X_p$ of per-pixel vectors around the neighborhood $\mathcal{N}(p)$ to produce the filtered output at pixel p. Given a denoising function $g(X_p; \theta)$ with parameters $\theta$ (which may be referred to as weights), the ideal denoising parameters at every pixel can be written as:

$$\hat{\theta}_p = \text{argmin}_\theta l(\bar{c}_p, g(X_p; \theta)), \quad (12)$$

where the denoised value is $\hat{c}_p = g(X_p; \hat{\theta}_p)$, and $l(\bar{c}, \hat{c})$ is a loss function between the ground truth values $\bar{c}$ and the denoised values $\hat{c}$.

Since ground truth values $\bar{c}$ are usually not available at run time, an MC denoising algorithm may estimate the denoised color at a pixel by replacing $g(X_p; \theta)$ with $\theta^T \phi(x_q)$, where function $\phi: \mathbb{R}^{3+D} \to \mathbb{R}^M$ is a (possibly non-linear) feature transformation with parameters $\theta$. A weighted least-squares regression on the color values, $c_q$, around the neighborhood, $q \in \mathcal{N}(p)$, may be solved as:

$$\hat{\theta}_p = \text{argmin}_\theta \sum_{q \in \mathcal{N}(p)} (c_q - \theta^T \phi(x_q))^2 \omega(x_p, x_q), \quad (13)$$

where $\omega(x_p, x_q)$ is the regression kernel. The final denoised pixel value may be computed as $\hat{c}_p = \hat{\theta}_p^T \phi(x_p)$. The regression kernel $\omega(x_p, x_q)$ may help to ignore values that are corrupted by noise, for example by changing the feature bandwidths in a joint bilateral filter. Note that $\omega$ could potentially also operate on patches, rather than single pixels, as in the case of a joint non-local means filter.

As discussed above, some of the existing denoising methods can be classified as zero-order methods with $\phi_0(x_q)=1$, first-order methods with $\phi_1(x_q)=[1; x_q]$, or higher-order methods where $\phi_m(x_q)$ enumerates all the polynomial terms of $x_q$ up to degree m (see Bitterli et al. for a detailed discussion). The limitations of these MC denoising approaches can be understood in terms of bias-variance tradeoff. Zero-order methods are equivalent to using an explicit function such as a joint bilateral or non-local means filter. These represent a restrictive class of functions that trade reduction in variance for a high modeling bias.

Using a first- or higher-order regression may increase the complexity of the function, and may be prone to overfitting as $\hat{\theta}_p$ is estimated locally using only a single image and can easily fit to the noise. To address this problem, Kalantari et al. proposed to take a supervised machine learning approach to estimate g using a dataset $\mathcal{D}$ of N example pairs of noisy image patches and their corresponding reference color information, $\mathcal{D} = \{(X_1, \bar{c}_1), \ldots, (X_N, \bar{c}_N)\}$, where $\bar{c}_i$ corresponds to the reference color at the center of patch $X_i$ located at pixel i of one of the many input images. Here, the goal is to find parameters of the denoising function, g, that minimize the average loss with respect to the reference values across all the patches in D:

$$\hat{\theta} = \text{argmin}_\theta \frac{1}{N} \sum_{i=1}^{N} l(\bar{c}_i, g(X_i; \theta)). \quad (14)$$

In this case, the parameters, $\theta$, are optimized with respect to all the reference examples, not the noisy information as in Eq. (13). If $\hat{\theta}$ is estimated on a large and representative training dataset, then it can adapt to a wide variety of noise and scene characteristics.

B. Deep Convolutional Denoising

In some embodiments, the denoising function g in Eq. (14) is modeled with a deep convolutional neural network (CNN). Since each layer of a CNN applies multiple spatial kernels with learnable weights that are shared over the entire image space, they are naturally suited for the denoising task and have been previously used for natural image denoising. In addition, by joining many such layers together with activation functions, CNNs may be able to learn highly nonlinear functions of the input features, which can be advantageous for obtaining high-quality outputs.

Figure 3:
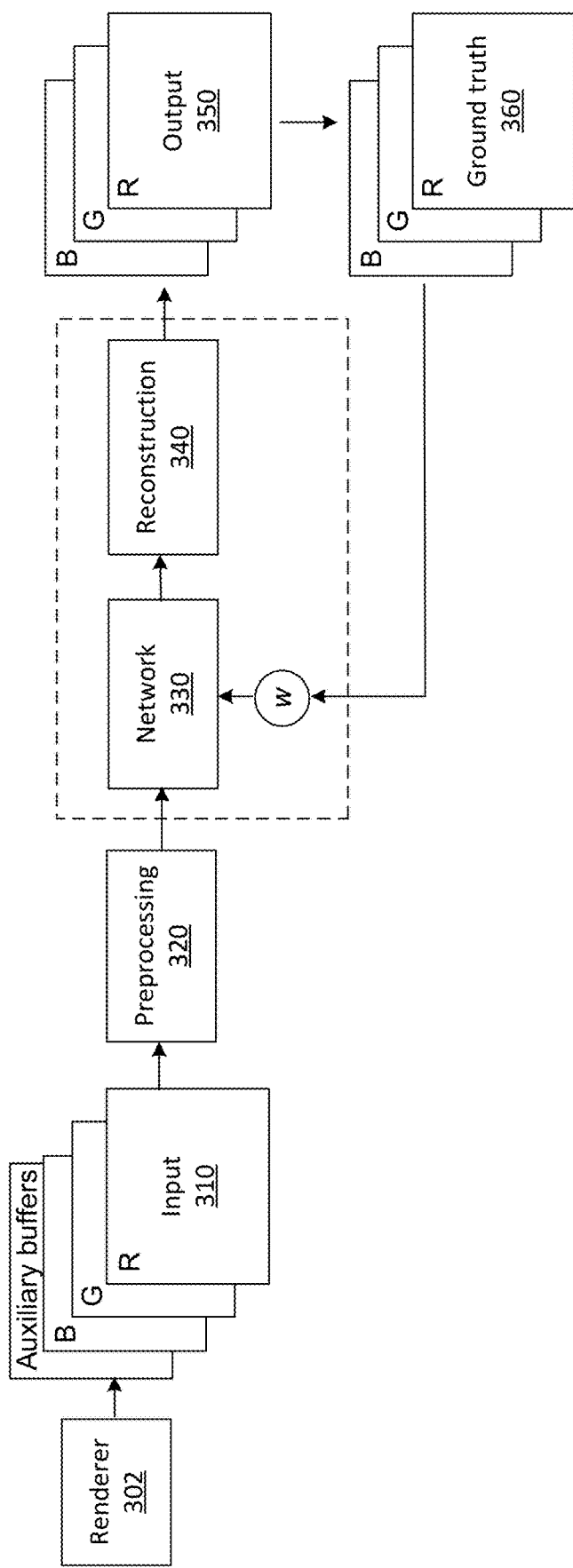
FIG. 3 illustrates an exemplary denoising pipeline according to some embodiments of the present invention.

FIG. 3 illustrates an exemplary denoising pipeline according to some embodiments of the present invention. The denoising method may include inputting raw image data (310) from a renderer 302, preprocessing (320) the input data, and transforming the preprocessed input data through a neural network 330. The raw image data may include intensity data, color data (e.g., red, green, and blue colors), and their variances, as well as auxiliary buffers (e.g., albedo, normal, depth, and their variances). The raw image data may also include other auxiliary data produced by the renderer 302. For example, the renderer 302 may also produce object identifiers, visibility data, and bidirectional reflectance distribution function (BRDF) parameters (e.g., other than albedo data). The preprocessing step 320 is optional. The neural network 330 transforms the preprocessed input data (or the raw input data) in a way that depends on many configurable parameters or weights, w, that are optimized in a training procedure. The denoising method may further include reconstructing (340) the image using the weights w output by the neural network, and outputting (350) a denoised image. The reconstruction step 340 is optional. The output image may be compared to a ground truth 360 to compute a loss function, which can be used to adjust the weights w of the neural network 330 in the optimization procedure.

C. Reconstruction

According to some embodiments, the function g outputs denoised color values using two alternative architectures: a direct-prediction convolutional network (DPCN) or a kernel-prediction convolutional network (KPCN).

1. Direct Prediction Convolutional Network (DPCN)

To produce the denoised image using direct prediction, one may choose the size of the final layer L of the network to ensure that for each pixel p, the corresponding element of the network output, $z_p^L \in \mathbb{R}^3$ is the denoised color:

$$\hat{c}_p = g_{direct}(X_p; \theta) = z_p^L. \quad (15)$$

Direct prediction can achieve good results in some cases. However, it is found that the direct prediction method can make optimization difficult in some cases. For example, the magnitude and variance of the stochastic gradients computed during training can be large, which slows convergence. In some cases, in order to obtain good performance, the DPCN architecture can require over a week of training.

2. Kernel Prediction Convolutional Network (KPCN)

According to some embodiments, instead of directly outputting a denoised pixel, $\hat{c}_p$, the final layer of the network outputs a kernel of scalar weights that is applied to the noisy neighborhood of p to produce $\hat{c}_p$. Letting $\mathcal{N}(p)$ be the k×k neighborhood centered around pixel p, the dimensions of the final layer can be chosen so that the output is $z_p^L \in \mathbb{R}^{k \times k}$. Note that the kernel size k may be specified before training along with the other network hyperparameters (e.g., layer size, CNN kernel size, and so on), and the same weights are applied to each RGB color channel.

Defining $[z_p^L]_q$ as the q-th entry in the vector obtained by flattening $z_p^L$, one may compute the final normalized kernel weights as, $$w_{pq} = \frac{\exp([z_p^L]_q)}{\sum_{q' \in N(p)} \exp([z_p^L]_{q'})}. \quad (16)$$

The denoised pixel color may be computed as, $$\hat{c}_p = g_{weighted}(X_p; \theta) = \sum_{q \in \mathcal{N}(p)} c_q w_{pq}. \quad (17)$$

The kernel weights can be interpreted as including a softmax activation function on the network outputs in the final layer over the entire neighborhood. This enforces that $0 \le w_{pq} \le 1$, $\nabla q \in \mathcal{N}(p)$ and $\sum_{q \in \mathcal{N}(p)} w_{pq} = 1$.

This weight normalization architecture can provide several advantages. First, it may ensure that the final color estimate always lies within the convex hull of the respective neighborhood of the input image. This can vastly reduce the search space of output values as compared to the direct-prediction method and avoids potential artifacts (e.g., color shifts). Second, it may ensure that the gradients of the error with respect to the kernel weights are well behaved, which can prevent large oscillatory changes to the network parameters caused by the high dynamic range of the input data. Intuitively, the weights need only encode the relative importance of the neighborhood; the network does not need to learn the absolute scale. In general, scale-reparameterization schemes have recently proven to be beneficial for obtaining low-variance gradients and speeding up convergence. Third, it can potentially be used for denoising across layers of a given frame, a common case in production, by applying the same reconstruction weights to each component.

Although both direct prediction method and kernal prediction method can converge to a similar overall error, the kernel prediction method can converge faster than the direct prediction method. Further details of the kernal prediction method are described in U.S. patent application Ser. No. 15/814,190, the content of which is incorporated herein by reference in its entirety.

V. Specialization

In some embodiments, a denoiser using a neural network may be trained on a first training dataset, and then be re-trained to be specialized for a specific production. Instead of starting from scratch, the denoiser may "remember" what it has learned from the first training, and transfer some of the prior knowledge into the new task using a second training dataset. That is, some of the parameters of the neural network optimized from the first training may be leveraged in the second training. In some cases, the first training dataset may contain a relatively large amount of data, whereas the second training dataset may contain a relatively small amount of data. For example, an initial model may be trained across a set of general images of a movie, and then that model may be re-used in a new model that specializes in certain special effects of the movie, such as explosions, clouds, fog, smoke, and the like. The new specialized model may be further specialized. For example, it may be further specialized to certain types of explosions.

A. Specialization Using Source Encoders

Embodiments of the present invention include a modular design that allows reusing trained components in different networks and facilitates easy debugging and incremental building of complex structures. In some embodiments, parts of a trained neural network may serve as low-level building blocks for novel tasks. A modular architecture may permit constructing large networks that would be difficult to train as monolithic blocks due to large memory requirements or training instability.

FIG. 4A illustrates an exemplary denoiser 400 according to some embodiments. The denoiser 400 may include a source encoder 420 coupled to the input 410, followed by a spatial-feature extractor 430. The output of the spatial-feature extractor 430 may be fed into a KPCN kernel-prediction module 440. The scalar kernels output by the kernel-prediction module 440 may be normalized using a softmax function 450. A reconstruction module 460 may apply the normalized kernels to the noisy input image 410 to obtain a denoised image 470. Exemplary embodiments of a kernel-prediction module 440 and the reconstruction module 460 are described above. The kernel-prediction module 440 is optional.

In some embodiments, the spatial-feature extractor 430 may include a number of residual blocks 432. FIG. 4B illustrates an exemplary residual block 432. In some embodiments, each residual block 432 may include two 3×3 convolutional layers 434 bypassed by a skip connection. In other embodiments, each residual block 432 may include more or fewer convolutional layers 434, and each layer 434 may include more or fewer nodes. A rectified linear unit (ReLU) may serve as the activation function that couples the two layers 434. Other types of activation functions may be used according to other embodiments. The skip connection may enable chaining many such residual blocks 432 without optimization instabilities. In some embodiments, up to 24 residual blocks 432 may be chained as illustrated in FIG. 4A. In other embodiments, more or fewer residual blocks 432 may be used. Further, the spatial-feature extractor 430 may include other types of neural networks, such as multilayer perceptron neural networks.

To make the denoiser 400 more versatile, the spatial-feature extractor 430 may be prefixed by the source encoder 420 as illustrated in FIG. 4A. In some embodiments, the source encoder 420 may include two 3×3 convolutional layers 422 coupled by a ReLU, as illustrated in FIG. 4A. In other embodiments, the source encoder 420 may include more or fewer layers 422, and each layer 422 may include more or fewer nodes. Other types of activation functions may also be used. The source encoder 420 may be tailored to extract common low-level features and unify the inputs to the spatial-feature extractor 430. For example, different input datasets may contain different cinematic effects, or may have different sets of auxiliary features. The source encoder 420 may be configured to translate the information present in an input dataset to a "common format" that can be fed into the spatial-feature extractor 430.

In cases when the denoiser 400 is expected to handle significantly different input datasets, for example, input datasets from different renderers with varying sets of auxiliary buffers, or with completely different visual content, there may be one source encoder 420 for each input dataset. In some embodiments, the denoiser 400 may be trained with a first training dataset using a first source encoder 420. For training the denoiser 400 with a second training dataset characteristically different from the first training dataset, a second source encoder 420 may be swapped in. Thus, the denoiser 400 may learn to use one or more source encoders 420 for creating a shared representation among multiple datasets from different data sources. In some embodiments, the initial training may use two or more training datasets and two or more corresponding source encoders 420. In some other embodiments, the initial training may use one training dataset and one corresponding source encoder 420.

Once the denoiser 400 has been initially trained, the parameters of the spatial-feature extractor 430 may be "frozen." The denoiser 400 may be subsequently adapted for a new training dataset by swapping in a new source encoder 420. The denoiser 400 may be re-trained on the new training dataset by optimizing only the parameters of the new source encoder 420. In this manner, the parameters of the spatial-feature extractor 430 are leveraged in the new task. Because a source encoder 420 may be relative shallow (e.g., with only two 3×3 convolutional layers as illustrated in FIG. 4A), the re-training may converge relatively fast. In addition, the re-training may require only a relatively small training dataset.

Figure 5:
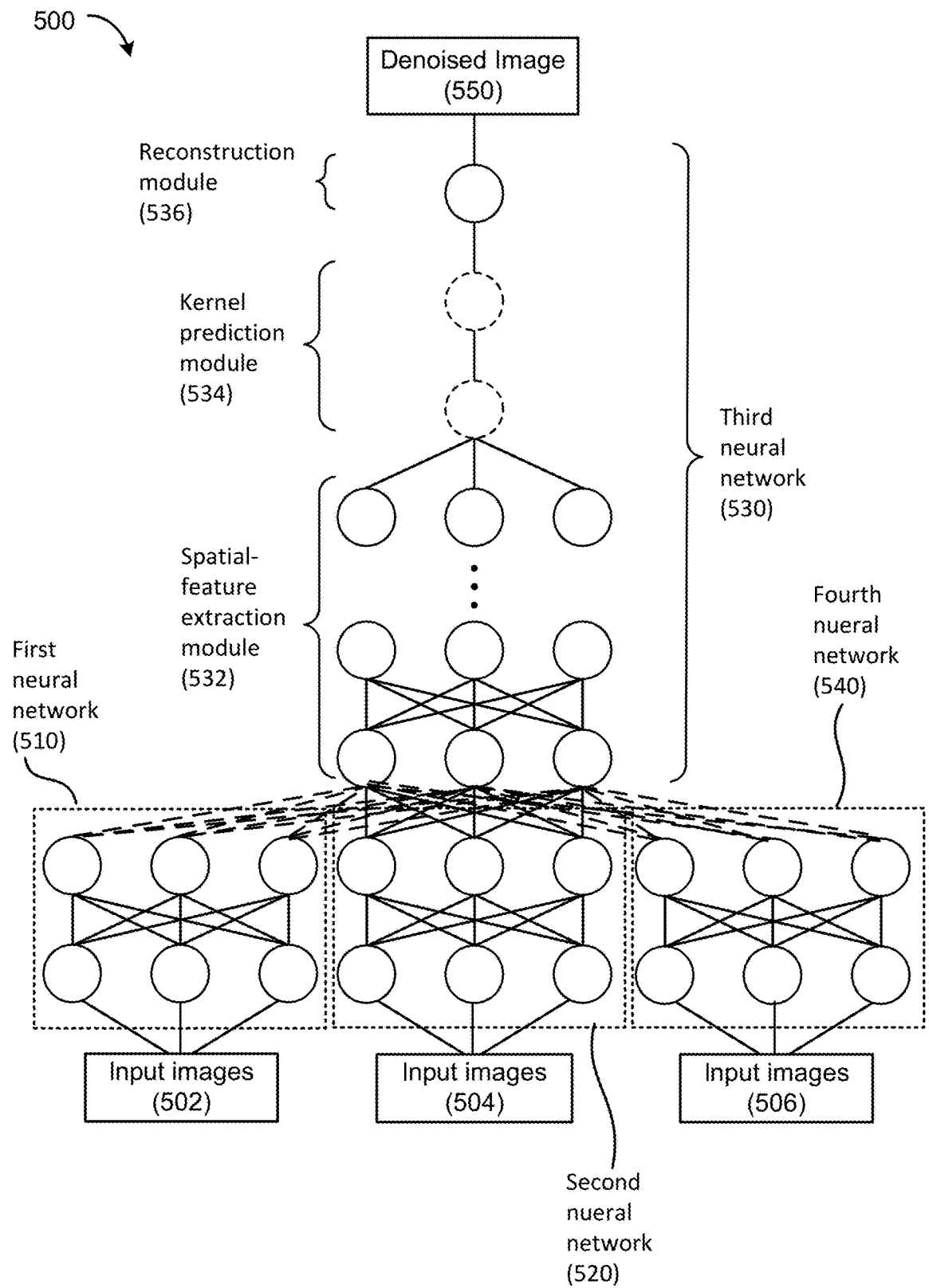
FIG. 5 illustrates a schematic diagram of a denoiser according to some embodiments of the present invention.

FIG. 5 illustrates a schematic diagram of a denoiser 500 according to some embodiments. The denoiser 500 may include a first neural network 510. The first neural network 510 may include a first plurality of layers and a first number of nodes associated with a first number of parameters. An input layer of the first neural network 510 is configured to receive a first set of input images 502. The first neural network 510 may be configured to extract a set of low-level features from each of the first set of input images 502.

The denoiser 500 may further include a third neural network 530. The third neural network 530 may include a third plurality of layers and a third number of nodes associated with a third number of parameters. An input layer of the third neural network 530 may receive output from an output layer of the first neural network 510, as illustrated in FIG. 5. In some embodiments, the third neural network 530 may include a spatial feature extraction module 532, a kernel prediction module 534, and a reconstruction module 536 as illustrated in FIG. 5. The kernel prediction module 534 may be configured to generate a plurality of weights associated with a neighborhood of pixels around each pixel of an input image. The reconstruction module 536 may be configured to reconstruct an output image using the plurality of weights. In some other embodiments, the kernel prediction module 534 and the reconstruction module 536 may be omitted. The combination of the first neural network 510 and the third neural network 530 may be trained using the first set of input images 502 along with a first set of corresponding reference images.

The denoiser 500 may further include a second neural network 520. The second neural network 520 may include a second plurality of layers and a second number of nodes associated with a second number of parameters. An input layer of the second neural network 520 is configured to receive a second set of input images 504. The second neural network 520 may be configured to extract a set of low-level features from each of the second set of input images 504.

In some embodiments, the second neural network 520 may be swapped in for the first neural network 510. That is, the input layer of the third neural network 530 may receive output from an output layer of the second neural network 520, as illustrated in FIG. 5. The combination of the second neural network 520 and the third neural network 530 may be trained using the second set of input images 504 along with a second set of corresponding reference images.

In some embodiments, the denoiser 500 may be trained using both the first set of input images 502 and the second set of input images 504. When the denoiser 500 is trained using the first set of input images 502, the input layer of the third neural network 530 receives the output of the output layer of the first neural network 510. The parameters of the first neural network 510 and the parameters of the third neural network 530 are optimized during training. When the denoiser 500 is trained using the second set of input images 504, the input layer of the third neural network 530 receives the output of the output layer of the second neural network 520. The parameters of the second neural network 520 and the parameters of the third neural network 530 are optimized during training.

In some embodiments, the training may be performed jointly on the first set of input images 502 and the second set of input images 504. For example, a few iterations may be performed using one or more input images from the first set of input images 502, followed by a few more iterations using one or more input images from the second set of input images 504, and so on and so forth. In some embodiments, even more sets of input images may be used with more low-level feature extraction neural networks similar to the first neural network 510 and the second neural network 520. In this manner, the denoiser 500 may learn to use multiple low-level feature extraction neural networks for creating a shared representation among multiple datasets from different data sources. In some other embodiments, the training may be performed sequentially on the first set of input images 502 and the second set of input images 504. For example, the combination of the first neural network 510 and the third neural network 530 may be trained using the first set of input images 502. Then the second neural network 520 is swapped in for the first neural network 510, and the combination of the second neural network 520 and the third neural network 530 may be trained using the second set of input images 504.

Once the denoiser 500 has been initially trained, the parameters of the third neural network 530 may be "frozen." The denoiser 500 may be re-trained for a new set of input images 506 by swapping in a fourth neural network 540, as illustrated in FIG. 5. The fourth neural network 540 may include a fourth plurality of layers and a fourth number of nodes associated with a fourth number of parameters. An input layer of the fourth neural network 540 is configured to receive the new set of input images 506. The fourth neural network 540 may be configured to extract a set of low-level features from each of the new set of input images 506, which is output to the input layer of the third neural network 530, as illustrated in FIG. 5. The combination of the fourth neural network 540 and the third neural network 530 may be trained using the new set of input images 506 and a corresponding new set of reference images. During the re-training, only the parameters of the fourth neural network 540 are optimized, while the parameters of the third neural network 530 optimized from the initial training are fixed.

Figure 6:
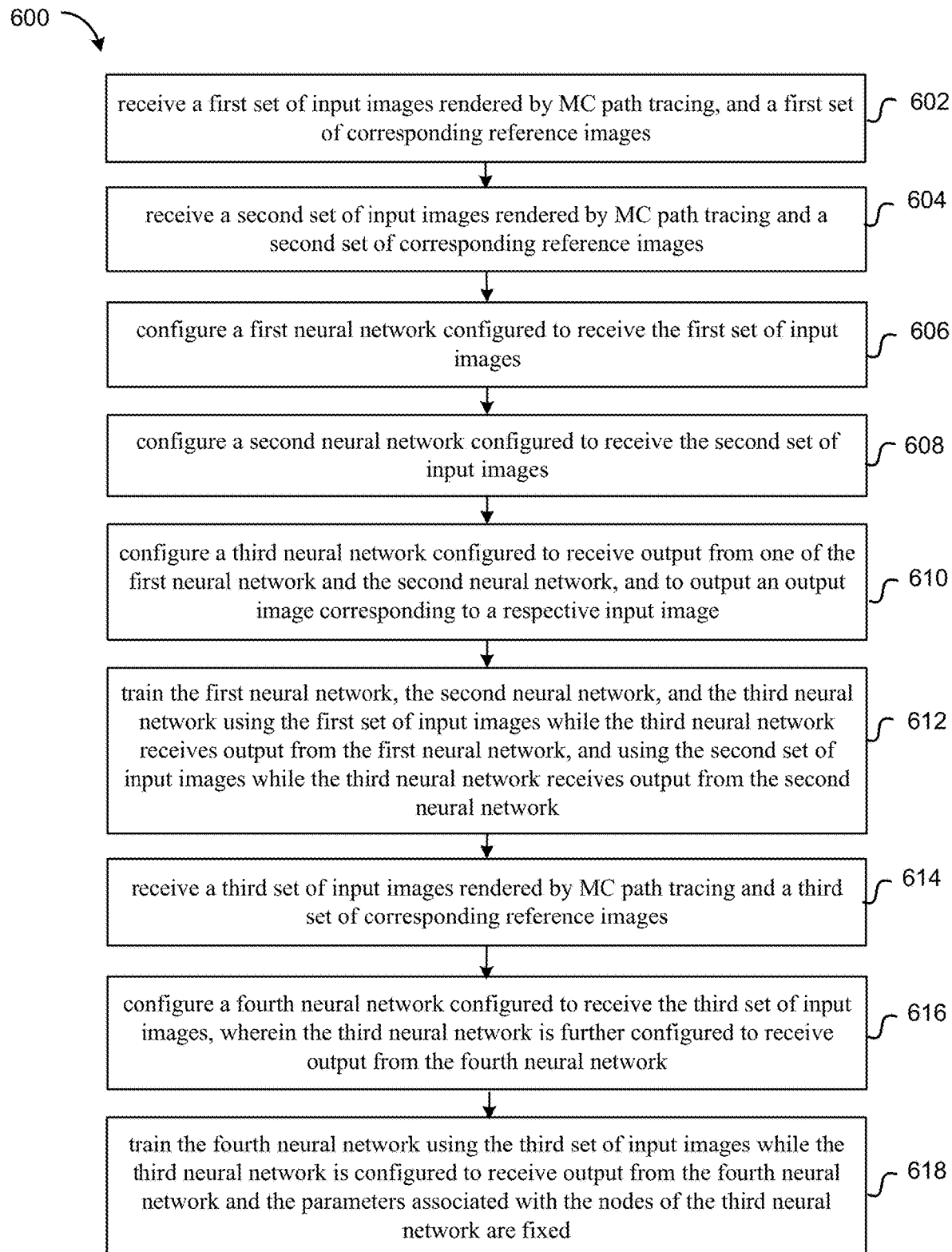
FIG. 6 is a flowchart illustrating a method of denoising images rendered by MC path tracing using the denoiser illustrated in FIG. 5 according to some embodiments of the present invention.

FIG. 6 is a flowchart illustrating a method 600 of denoising images rendered by MC path tracing using the denoiser 500 illustrated in FIG. 5 according to some embodiments.

At 602, a first set of input images rendered by MC path tracing and a first set of corresponding reference images are received.

At 604, a second set of input images rendered by MC path tracing and a second set of corresponding reference images are received. In some embodiments, the second set of input images may have different characteristics than those of the first set of input images. For example, the it may contain a different type of image content than that of the first set of input images, or may be rendered by a different type of renderer.

At 606, a first neural network is configured. The first neural network (e.g., the first neural network 510 illustrated in FIG. 5) may include a first plurality of layers and a first number of nodes associated with a first number of parameters. The first neural network may be configured to receive the first set of input images.

At 608, a second neural network is configured. The second neural network (e.g., the second neural network 520 illustrated in FIG. 5) may include a second plurality of layers and a second number of nodes associated with a second number of parameters. The second neural network may be configured to receive the second set of input images.

At 610, a third neural network is configured. The third neural network (e.g., the third neural network 530 illustrated in FIG. 5) may include a third plurality of layers and a third number of nodes associated with a third number of parameters. The third neural network may be configured to receive output from one of the first neural network and the second neural network, and output an output image corresponding to a respective input image.

At 612, the first neural network, the second neural network, and the third neural network may be trained to obtain a first number of optimized parameters associated with the first number of nodes of the first neural network, a second number of optimized parameters associated with the second number of nodes of the second neural network, and a third number of optimized parameters associated with the third number of nodes of the third neural network. The training may use the first set of input images and the first set of reference images while the third neural network receives output from the first neural network, and may use the second set of input images and the second set of reference images while the third neural network receives output from the second neural network. The training may be performed jointly or sequentially on the first set of input images and the second set of input images, as discussed above with reference to FIG. 5.

At 614, a third set of input images rendered by MC path tracing and a third set of corresponding reference images are received. In some embodiments, the third set of input images may have different characteristics than those of the first set of input images and the second set of input images. For example, the it may contain a different type of image content, or may be rendered by a different type of renderer.

At 616, a fourth neural network is configured. The fourth neural network (e.g., the fourth neural network 540 illustrated in FIG. 5) may include a fourth plurality of layers and a fourth number of nodes associated with a fourth number of parameters. The fourth neural network may be configured to receive the third set of input images. The fourth neural network may be swapped in place of the first neural network or the second neural network, so that the third neural network may receive output from the fourth neural network.

At 618, the fourth neural network is trained in conjunction with the third neural network, while the third number of optimized parameters associated with the third number of nodes of the third neural network obtained from the previous training are fixed. The training is performed using the third set of input images to obtain a fourth number of optimized parameters associated with the fourth number of nodes of the fourth neural network.

Once the fourth neural network has been trained, the combination of the fourth neural network and the third neural network may be used for denoising a new input image similar to the images in the third set of input images (e.g., of similar type of image content or rendered by the same renderer).

It should be appreciated that the specific steps illustrated in FIG. 6 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

B. Specialization Using Progressive Neural Networks

In some embodiments, specialization may be achieved by using a progressive neural network (also referred to as an "adaptation" neural network). A progressive neural network may start with a first column, which may be a deep neural network having a number of layers, each layer having a number of nodes. The first column may be trained on a first task. When switching to a second task, the parameters (e.g., the weights of the nodes) of the first column are "frozen," and a second column is instantiated, thereby increasing a width of the model for at least some of the layers. The second column typically has the same number of layers (thus having the same depth) as the first column, although this is not required. The parameters of the first column are laterally transferred to the second column. Each of the first column and the second column can be a multilayer perceptron (MLP) neural network, a convolutional neural network (CNN), or the like.

Figure 7:
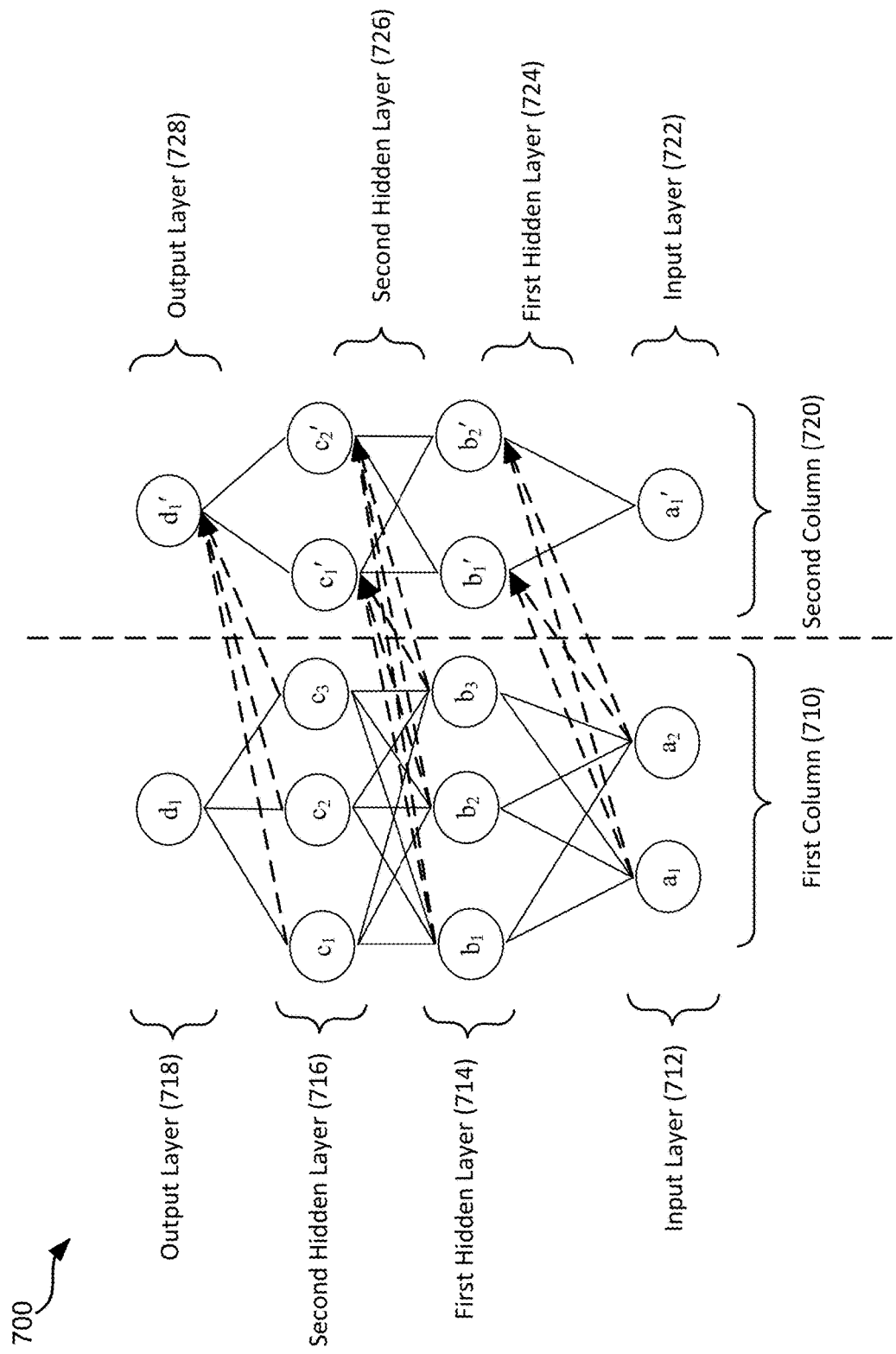
FIG. 7 illustrates an exemplary structure of a progressive neural network according to some embodiments of the present invention.

FIG. 7 illustrates an exemplary structure of a progressive neural network 700. The progressive neural network 700 may include a first column 710 and a second column 720. The first column 710 may include an input layer 712, an output layer 718, and two hidden layers 714 and 716. The input layer 712 may include two nodes $a_1$ and $a_2$; the first hidden layer 714 may include three nodes $b_1$, $b_2$, and $b_3$; the second hidden layer 716 may include three nodes $c_1$, $c_2$, and $c_3$; and the output layer 718 may include one node $d_1$. The layers can be fully connected. The number of layers and the number of nodes in each layer for the first column are shown for illustration purposes. The first column can include more or fewer layers, and each layer can include more or less nodes than illustrated in FIG. 7.

After the first column 710 has been trained on a first training dataset, the parameters associated with the various nodes of the first column 710 are "frozen," so that they will not be "forgotten." The second column 720 is then instantiated. The second column 720 may also include an input layer 722, an output layer 728, and two hidden layers 724 and 726. The input layer 722 may include one node $a_1$; the first hidden layer 724 may include two nodes $b_1'$ and $b_2'$; the second hidden layer 726 may include two nodes $b_1'$ and $b_2'$; and the output layer 728 may include one node $d_1'$. The layers are may be fully connected. The number of layers and the number of nodes in each layer for the second column 720 are shown for illustration purposes. The second column 720 may include more or fewer layers, and each layer may include more or less nodes than illustrated in FIG. 7.

Before training, the parameters associated with the various nodes of the second column 720 may be randomly initialized. The parameters associated with the nodes of the first column 710 may be laterally transferred to the second column 720 as indicated by the dashed arrows. Thus, each node in the first hidden layer 724 of the second column 720, $b_1'$ or $b_2'$, receives input from $a_1$ and $a_2$, as well as from $a_1$; each of the nodes in the second hidden layer 726 of the second column 720, $c_1'$ or $c_2'$, receives input from $b_1$, $b_2$, and $b_3$, as well as from $b_1'$ and $b_2'$; and the node of the output layer 728 of the second column 720, $d_1'$, receives input from $c_1$, $c_2$, and $c_3$, as well as from $c_1'$ and $c_2'$. The parameters associated with the nodes of the second column 720 are then trained on a second training dataset. In the training process, the parameters transferred from the first column 710 may be multiplied by various weights, and the weights are trained. In effect, the second column 710 takes what it considers useful or common for the second task from the knowledge gained from the first task performed by the first column 710, and applies that to the second task. Therefore, training on the second training dataset may be accelerated.

In some embodiments, even more columns may be instantiated for further tasks. For example, a third column may leverage on the parameters of the first column and the second column. In this fashion, prior knowledge may be propagated through the columns like a "snowball." In some embodiments, some nodes in the previous columns may be combined so that the total number of nodes in a given layer do not get too large as more and more columns are added. For example, two nodes may be combined using a max or an add operation.

A denoiser based on progressive neural networks may be applied in various settings. For example, a network may be initially trained on a set of frames from the animated movie Finding Dory, which may include say 600 frames. The parameters learned from that training may be leveraged in training on a new set of frames for the animated movie Cars, which may include only a handful of rendered frames. As another example, a first set of data may be more general, and a second set of data may be more specialized. For instance, a network may be initially trained on many different cars. The first training may take, for example, as long as two weeks. The knowledge learned in that training may be leveraged for training on a specific car, so that the second training may take much less time. As a further example, a first set of data may include images of a general scene, and a second set of data may be images of a special lighting effects, such as an explosion that may include fire, water, oil, and other visual effects.

Figure 8:
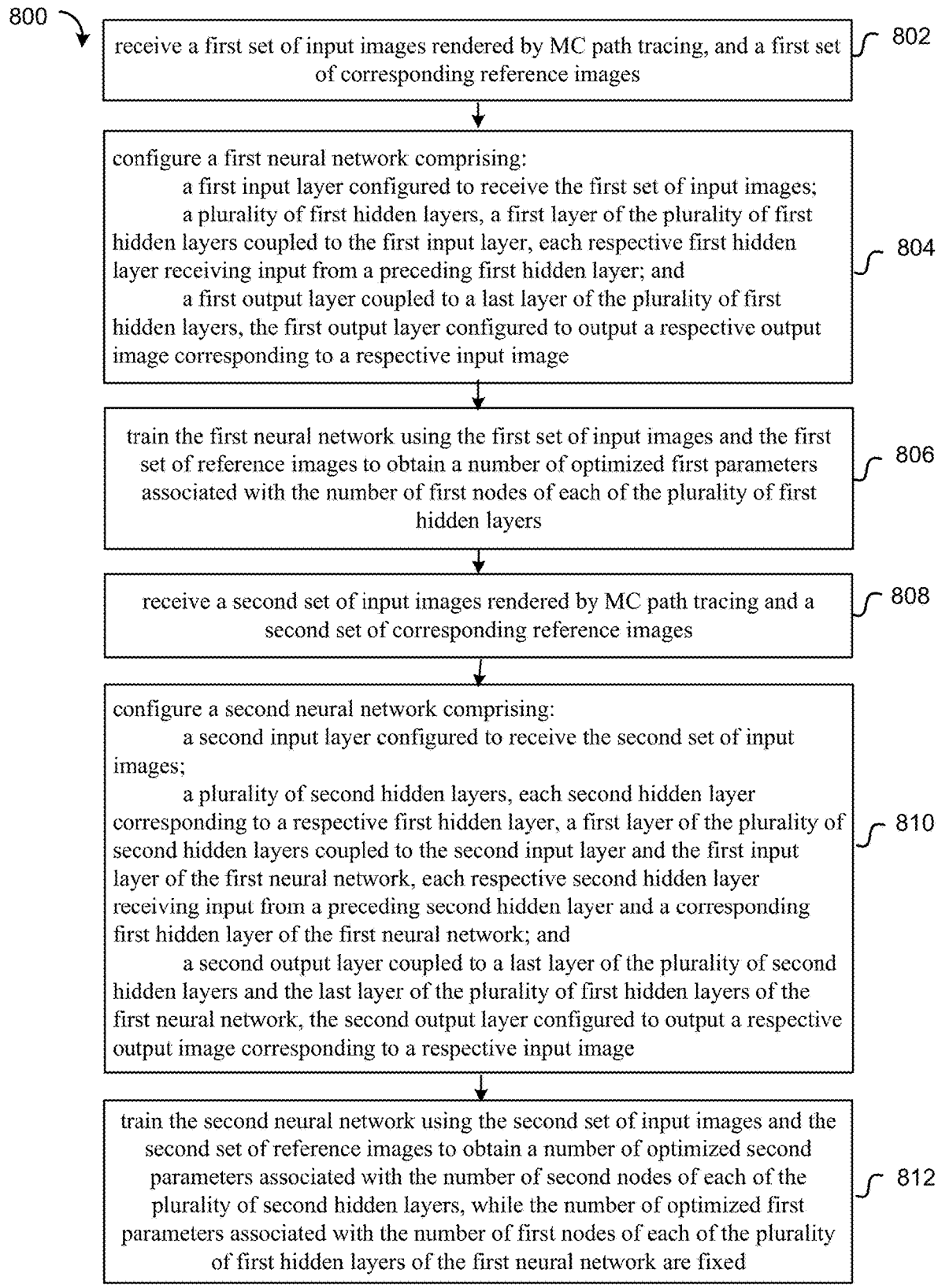
FIG. 8 is a flowchart illustrating a method of denoising images rendered by MC path tracing using progressive neural network according to some embodiments of the present invention.

FIG. 8 is a flowchart illustrating a method of denoising images rendered by MC path tracing using the denoiser 700 illustrated in FIG. 7 according to some embodiments.

At 802, a first set of input images rendered by MC path tracing and a first set of corresponding reference images are received.

At 804, a first neural network (e.g., the first column 710) is configured. The first neural network may include a first input layer configured to receive the first set of input images, and a plurality of first hidden layers. Each first hidden layer may have a respective number of first nodes associated with a respective number of first parameters. A first layer of the plurality of first hidden layers may be coupled to the first input layer. Each respective first hidden layer may receive input from a preceding first hidden layer. The first neural network may also include a first output layer coupled to a last layer of the plurality of first hidden layers. The first output layer may be configured to output a respective output image corresponding to a respective input image.

At 806, the first neural network may be trained using the first set of input images and the first set of reference images to obtain a number of optimized first parameters associated with the number of first nodes of each of the plurality of first hidden layers of the first neural network.

At 808, a second set of input images rendered by MC path tracing and a second set of corresponding reference images are received. In some embodiments, the second set of input images may have different characteristics than those of the first set of input images. For example, the it may contain a different type of image content, or may be rendered by a different type of renderer.

At 810, a second neural network (e.g., the second column 720 as illustrated in FIG. 7) is configured. The second neural network may include a second input layer configured to receive the second set of input images, and a plurality of second hidden layers. Each second hidden layer corresponds to a respective first hidden layer, and may have a respective number of second nodes associated with a respective number of second parameters. A first layer of the plurality of second hidden layers may be coupled to the second input layer and the first input layer of the first neural network. Each respective second hidden layer may receive input from a preceding second hidden layer and a corresponding first hidden layer of the first neural network. The second neural network may further include a second output layer coupled to a last layer of the plurality of second hidden layers and the last layer of the plurality of first hidden layers of the first neural network. The second output layer may be configured to output a respective output image corresponding to a respective input image.

At 812, the second neural network is trained using the second set of input images and the second set of reference images to obtain a number of optimized second parameters associated with the number of second nodes of each of the plurality of second hidden layers. During the training, the number of optimized first parameters associated with the number of first nodes of each of the plurality of first hidden layers of the first neural network may be fixed.

Once the second neural network has been trained, the combination of the first neural network and the second neural network may be used for denoising a new input image similar to the images in the second set of input images (e.g., of similar type of image content or rendered by the same renderer).

It should be appreciated that the specific steps illustrated in FIG. 8 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

In some further embodiments, a denoiser may combine a progressive neural network (e.g., the neural network illustrated in FIG. 7) with the modular approach described above with reference to FIG. 5 for specializing.

VI. Importance Sampling of the Training Set

One aspect of denoising Monte Carlo renderings, as opposed to denoising photographs, is that the task complexity may not be uniform across the training dataset. The noise characteristics as well as its magnitude may vary greatly from one frame to another, or even within a frame. Similarly, the auxiliary data used for inference (e.g., surface normal, albedo, depth, and the like) may be more or less challenging to leverage locally depending on the light transport or geometric complexity. For example, images of ground planes may comprise mostly smooth patches, and it may be relatively easy for the neural network to improve denoising quality during training; whereas images of water or shining surfaces may contain more varying colors, and therefore it may be more difficult and more challenging for the neural network to converge to a high quality denoised image during training. Therefore, it may be advantageous to identify training patches that are likely to have more useful gradients (i.e., more challenging patches) for the neural network to "learn" from.

A. Importance Sampling Based on Image Metrics

Embodiments of the present invention include training a neural network using importance sampling where more challenging patches within a training dataset are selected with higher probabilities than others. The sampling probabilities can depend on some image metrics, such as average pixel color variance within a patch, average local variance of the color buffer, variance of surface normals within a patch, presence of edges in the image, variance of the effective diffuse irradiance (which can be obtained by dividing out the surface albedo from the surface diffuse color), differences between a noisy input image and a corresponding high quality reference image according to any loss metric, and the like.

According to some embodiments, a rendered image may be divided into multiple patches (i.e., subimages). Patches in a training dataset may be analyzed to obtain one or more image metrics for each patch. A sampling probability function may be constructed as a function of the one or more image metrics. For instance, a probability function may take the form of $P=\alpha \times \text{variance (color)} + \beta \times \text{variance (normal)}$, where $\alpha$ and $\beta$ are the relative weights of the terms. The patches in the training dataset may be randomly sampled during training of the neural network according to the probability function.

Figures 9A, 9B:
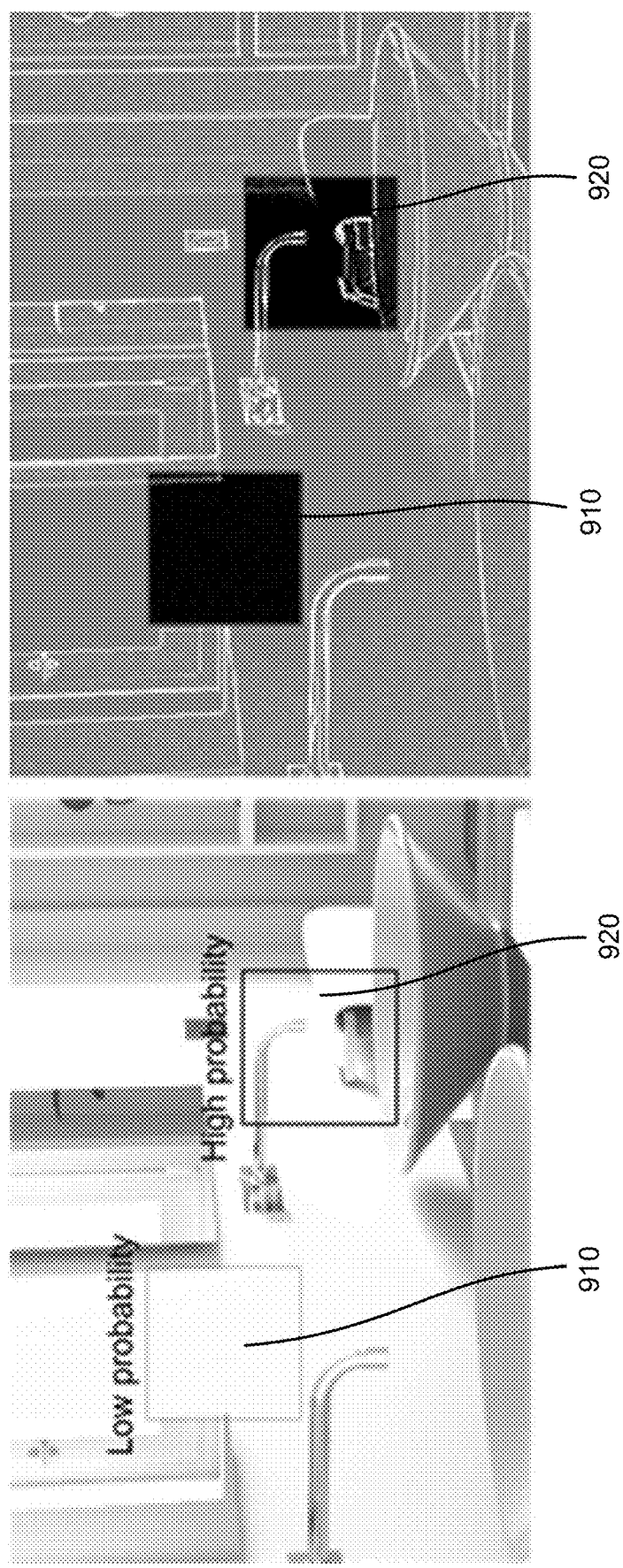
FIGS. 9A and 9B illustrate a method of importance sampling based on presence of edges in the input images according to some embodiments of the present invention.

As an example, FIGS. 9A and 9B illustrate a method of importance sampling based on presence of edges in the input images. FIG. 9A shows an exemplary rendered input image of a part of a bathroom. The input image may be divided into a number of patches, which may form parts of a training dataset. A first patch 910 of the input image includes a section of a wall, whereas a second patch 920 of the input image includes a faucet and some fixtures of a sink. FIG. 9B shows an edge image generated from the color input image shown in FIG. 9A. The edge image may be generated from auxiliary buffers or by some edge detection algorithms. As illustrated, more edges are present in the second patch 920 than in the first patch 910. Thus, according to some embodiments, patches similar to the second patch 920 may be sampled with higher probabilities than patches similar to the first patch 910.

Figure 10:
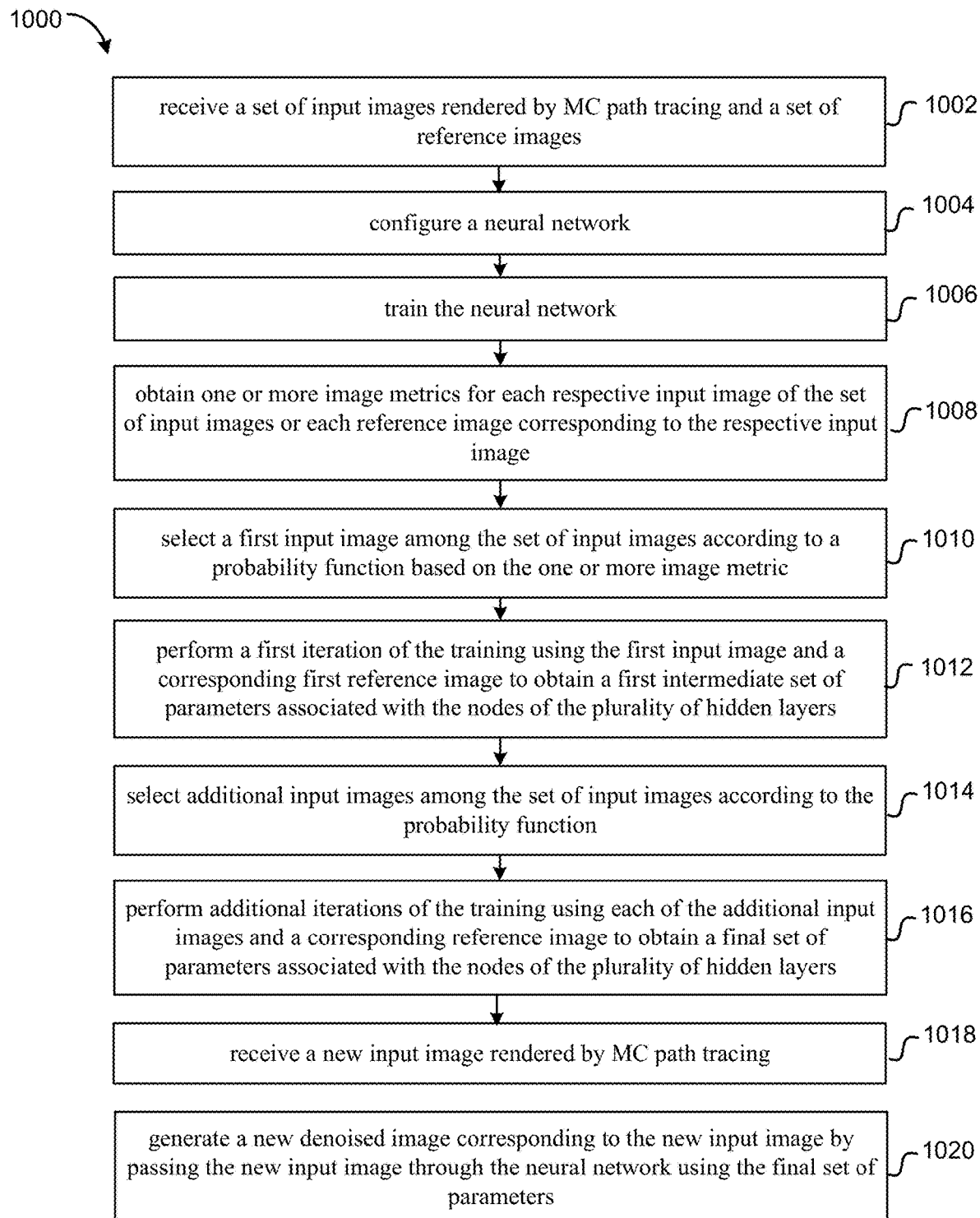
FIG. 10 is a flowchart illustrating a method of denoising images rendered by MC path tracing using importance sampling according to some embodiments of the present invention.

FIG. 10 is a flowchart illustrating a method of denoising images rendered by MC path tracing using importance sampling according to some embodiments.

At 1002, a set of input images rendered by MC path tracing, and a set of reference images are received. Each reference image corresponds to a respective input image.

At 1004, a neural network is configured. The neural network may include an input layer configured to receive the set of input images, and a plurality of hidden layers. Each hidden layer has a respective number of nodes. Each node is associated with a respective parameter. A first layer of the plurality of hidden layers is coupled to the input layer. The neural network may further include an output layer coupled to a last layer of the plurality of hidden layers and configured to output a respective denoised image corresponding to a respective input image.

At 1006, the neural network is trained using the set of input images and the set of reference images. The training may include the steps described below.

At 1008, one or more image metrics are obtained for each respective input image of the set of input images, or obtained for each reference image corresponding to the respective input image. The one or more image metrics may include, for example, average pixel color variance within an input image or a corresponding reference image, average local variance of the color buffer, variance of surface normals within an input image or a corresponding reference image, presence of edges in an input image or a corresponding reference image, variance of the effective diffuse irradiance (which can be obtained by dividing out the surface albedo from the surface diffuse color), differences between an input image and a corresponding reference image, and the like.

At 1010, a first input image may be selected among the set of input images according to a probability function based on the one or more image metrics. For example, the probability function may be proportional to the one or more image metrics in some embodiments.

At 1012, a first iteration of the training may be performed using the first input image and a corresponding first reference image to obtain a first intermediate set of parameters associated with the nodes of the plurality of hidden layers.

At 1014, additional input images may be selected among the set of input images according to the probability function.

At 1016, additional iterations of the training may be performed using each of the additional input images and a corresponding reference image to obtain a final set of parameters associated with the nodes of the plurality of hidden layers. Once the neural network has been trained, the neural network may be used to denoise a new input image.

At 1018, a new input image rendered by MC path tracing may be received.

At 1020, a new denoised image corresponding to the new input image may be generated by passing the new input image through the neural network using the final set of parameters.

In each iteration of the training, an intermediate denoised image may be compared with a corresponding reference image to obtain a gradient of a loss function for each pixel, which may be back-propagated through the neural network to obtain an updated set of parameters associated with the nodes of the plurality of hidden layers. In some embodiments, the gradient of the loss function may be normalized by the probability function. For example, the normalization may include dividing the gradient of the loss function by the probability function.

It should be appreciated that the specific steps illustrated in FIG. 10 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

B. Importance Sampling for Improving Convergence

According to some embodiments, importance sampling in patch selection during training may be used to achieve faster convergence. As discussed above in relation to Eq. (6), in supervised machine learning, the aim may be to find a set of parameters $\vec{w}$ that minimize a cost function or loss L ($\mathcal{D}_{train}$, $\vec{w}$), (also referred herein as error) over a training dataset $\mathcal{D}_{train}$, which is typically the sum of errors on the entries of the dataset:

$$L(\mathcal{D}_{train}, \vec{w}) = \frac{1}{|\mathcal{D}_{train}|} \sum_{(\vec{x}_i, \vec{y}_i) \in \mathcal{D}_{train}} l(\tilde{y}_i, f(\vec{x}_i, \vec{w})), \quad (6)$$

where x is a set of explanatory variables, y is a set of response variables, and $l(\tilde{y}_i, f(\vec{x}_i, \vec{w}))$ is the per-sample loss function. In a gradient descent optimization algorithm, the gradient of the loss function L over the training dataset may be expressed as, $$\nabla L(\mathcal{D}_{train}, \vec{w}) = \frac{1}{|\mathcal{D}_{train}|} \sum_{(\vec{x}_i, \vec{y}_i) \in \mathcal{D}_{train}} \nabla l(y_i, f(\vec{x}_i, \vec{w})). \quad (18)$$

According to some embodiments, training the neural network may be performed in two stages. In the first stage, several iterations may be performed where patches among the training dataset are randomly sampled with a uniform probability. The error gradients may then be evaluated for each patch of the entire training dataset. In the second stage, patches with larger error gradients are sampled with higher probabilities. By selecting patches with larger error gradients with higher probabilities, variance of the error gradients over the entire training dataset may decrease faster, thus resulting in faster convergence.

In some embodiments, the error gradients may be normalized by the sampling probability. In a stochastic gradient descent method, one may take a single sample ($x_i$, $y_i$) from a training dataset $D_{train}$ and use $\nabla l(y_i, f(\vec{x}_i, \vec{w}))$ based on the sample ($x_i$, $y_i$) as an estimate of the loss over the full dataset $D_{train}$. Sampling some of the patches within the dataset $D_{train}$ with a higher probability may make the estimate biased towards those patches sampled with higher probability. This bias may be removed by dividing the gradient by the selection probability, making it an unbiased estimator for Eq. (18). The normalization may ensure that the patches that are sampled more often do not have proportionally larger impact over the entire training dataset, and that the training may converge to the same mean value while the training time is decreased.

Figure 11:
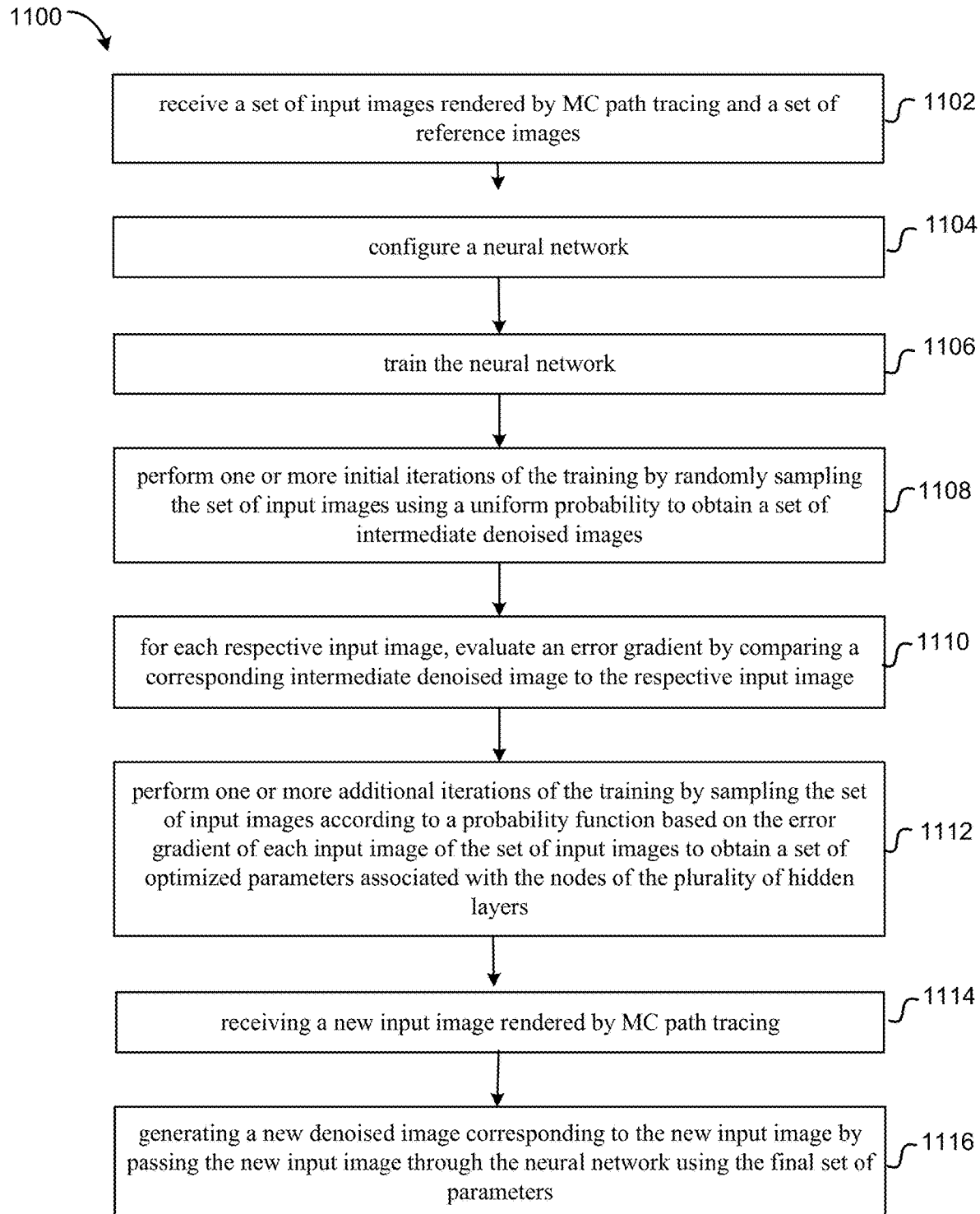
FIG. 11 is a flowchart illustrating a method of denoising images rendered by MC path tracing using importance sampling according to some other embodiments of the present invention.

FIG. 11 is a flowchart illustrating a method of denoising images rendered by MC path tracing using importance sampling according to some embodiments.

At 1102, a set of input images rendered by MC path tracing and a set of reference images are received. Each reference image corresponds to a respective input image.

At 1104, a neural network is configured. The neural network may include an input layer configured to receive the set of input images, and a plurality of hidden layers. Each hidden layer has a respective number of nodes. Each node is associated with a respective parameter. A first layer of the plurality of hidden layers is coupled to the input layer. The neural network may further include an output layer coupled to a last layer of the plurality of hidden layers and configured to output a respective denoised image corresponding to a respective input image.

At 1106, the neural network is trained using the set of input images and the set of reference images. The training may include the steps described below.

At 1108, one or more initial iterations of the training may be performed by randomly sampling the set of input images using a uniform probability to obtain a set of intermediate denoised images. Each intermediate denoised image corresponds to a respective input image.

At 1110, for each respective input image, an error gradient is evaluated by comparing a corresponding intermediate denoised image to the respective input image.

At 1112, one or more additional iterations of the training may be performed by sampling the set of input images according to a probability function based on the error gradient of each input image of the set of input images to obtain a set of optimized parameters associated with the nodes of the plurality of hidden layers. Once the neural network has been trained, the neural network may be used to denoise a new input image.

At 1114, a new input image rendered by MC path tracing may be received.

At 1116, a new denoised image corresponding to the new input image may be generated by passing the new input image through the neural network using the final set of parameters.

In each iteration of the training, an intermediate denoised image may be compared with a corresponding reference image to obtain a gradient of a loss function for each pixel, which may be back-propagated through the neural network to obtain an updated set of parameters associated with the nodes of the plurality of hidden layers. In some embodiments, the gradient of the loss function may be normalized by the probability function. For example, the normalization may include dividing the gradient of the loss function by the probability function.

It should be appreciated that the specific steps illustrated in FIG. 11 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

C. Importance Sampling for Biased Training

In some embodiments, importance sampling in patch selection is used for biased training. Biased training may be desirable for various purposes. For example, one may care more about hair and faces in an image than other parts of the image. Thus, it may be desirable to sample training patches that include hair and faces more often during training, so that the neural network may do a better job at denoising parts of an image containing hair and faces, perhaps at the expense of doing a poorer job at denoising parts of the image containing other content. As another example, an artist for an animation movie production may care more about the image quality concerning a main character. Thus, it may be desirable to sample patches that include the main character more often.

According to some embodiments, sampling probability may be based on certain subjective image metrics, such as the presence of faces or hair, the presence of a main character, or some other features. In some embodiments, each patch in a training dataset may be assigned a relevance score indicating a degree of relevance to an area of interest. A probability function may be proportional to the relevance score. For biased training, unlike in the case for improving convergence, the error gradients are not normalized by the sampling probability. As such, the neural network may focus on minimizing errors in areas of particular concern at the expense of other areas.

In some other embodiments, sampling probability may be based on certain perceptual metrics. Perceptual losses may be challenging to use while training, as they typically rely on a robust model of the Human Visual System (HVS), which can make them prohibitively expensive to compute. Perceptual losses may also rely on local statistics, which can make it difficult to precisely identify the source of errors. In addition, perceptual losses tend to focus on measuring Just Noticeable Differences (JND), which may not offer meaningful error gradients outside of a high-quality range.

Embodiments of the present invention may overcome or mitigate these challenges by using a biased training scheme that relies on standard objective metrics, such as the relative absolute reconstruction error, that are cheap to compute, rely on per-pixel behavior, and may have consistent gradients at all error magnitudes. Such biased training may incorporate perceptual metrics in an indirect way.

In some embodiments, a neural network may be trained in two stages. In a first stage, some iterations may be performed by sampling the training patches with either a uniform probability, or a probability function based on some heuristic metrics to identify potentially challenging patches with normalization as discussed above. Then, the performance of the neural network may be evaluated using a perceptual metric on the entire training set. The perceptual metric may include, for example, Google's Butteraugli, structural similarity index (SSIM) or multiscale SSIM. In a second stage, biased training is performed by selecting training patches with a probability that is proportional to the perceptual error magnitude without normalization. Thus, the second stage of training may fine-tune the performance of the neural network by focusing on minimizing the errors in regions with perceptually salient reconstruction errors.

As an extension to the two-stage training, perceptual error magnitudes may be stored at multiple moments in time during a multiple-stage training. As the perceptual error magnitudes are stored each time, subsequent training may select training patches according to probabilities based on the newly stored perceptual error magnitudes. In some other embodiments, the perceptual error magnitudes may be updated continuously and asynchronously during training. This mode of training may be referred to as on-line training.

Figure 12:
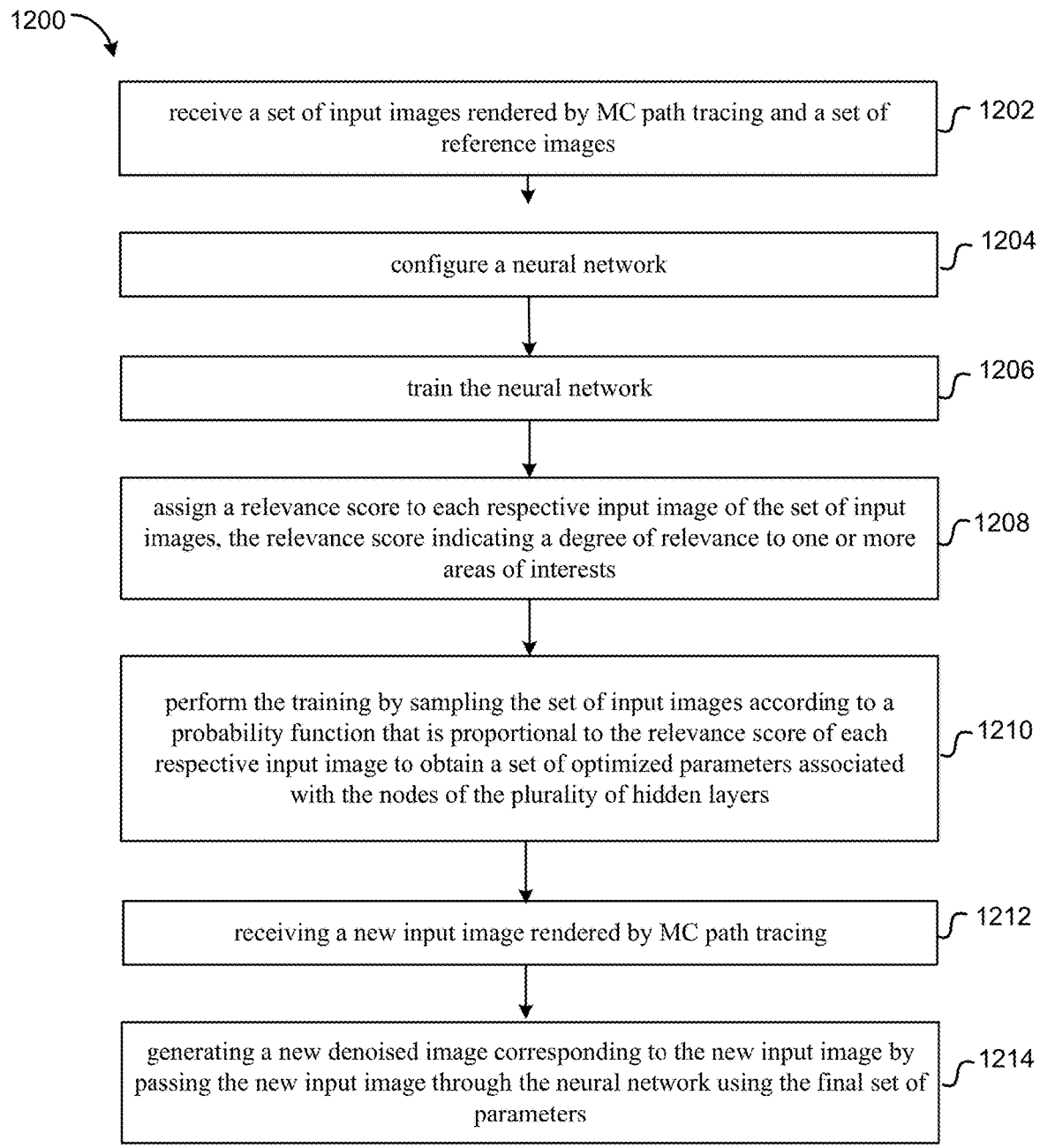
FIG. 12 is a flowchart illustrating a method of denoising images rendered by MC path tracing using importance sampling according to some further embodiments of the present invention.

FIG. 12 is a flowchart illustrating a method of denoising images rendered by MC path tracing using importance sampling according to some embodiments.

At 1202, a set of input images rendered by MC path tracing and a set of reference images are received. Each reference image corresponds to a respective input image.

At 1204, a neural network is configured. The neural network may include an input layer configured to receive the set of input images, and a plurality of hidden layers. Each hidden layer has a respective number of nodes. Each node is associated with a respective parameter. A first layer of the plurality of hidden layers is coupled to the input layer. The neural network may further include an output layer coupled to a last layer of the plurality of hidden layers and configured to output a respective denoised image corresponding to a respective input image.

At 1206, the neural network is trained using the set of input images and the set of reference images. The training may include the steps described below.

At 1208, a relevance score may be assigned to each respective input image of the set of input images. The relevance score may indicate a degree of relevance to one or more areas of interests. For example, the relevance score may relate to the presence of faces or hair, the presence of a main character, and the like.

At 1210, performing the training by sampling the set of input images according to a probability function that is proportional to the relevance score of each respective input image to obtain a set of optimized parameters associated with the nodes of the plurality of hidden layers. Once the neural network has been trained, the neural network may be used to denoise a new input image.

At 1212, a new input image rendered by MC path tracing may be received.

At 1214, a new denoised image corresponding to the new input image may be generated by passing the new input image through the neural network using the final set of parameters.

In each iteration of the training, an intermediate denoised image may be compared with a corresponding reference image to obtain a gradient of a loss function for each pixel, which may be back-propagated through the neural network to obtain an updated set of parameters associated with the nodes of the plurality of hidden layers. In some embodiments, the gradient of the loss function may not be normalized by the probability function so as to achieve biased training, in which the neural network focuses on minimizing errors in certain areas of particular concern at the expense of other areas.

It should be appreciated that the specific steps illustrated in FIG. 12 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

VII. Denoising Using Generative Adversarial Nets and Upsampling

The goal of denoising Monte Carlo renderings may be to create an algorithm that takes low-quality, cheap-to-render images as input and produce corresponding images that look similar to the "ground truth" images that may be produced with an expensive high quality rendering of the same scenes with more sampling rays per pixel. Ideally, the degree of "looking similar" should be judged by humans.

A denoiser using machine learning that is optimized based on training data may require an optimization target. As discussed above, a possible optimization target may be the minimization of an expected loss between a denoised image and a corresponding ground truth over a training dataset, as judged by a loss function that measures the disparity between two images. The choice of loss function may affect the appearance of the denoised images. A good loss function should ideally reflect human perceptions. Most commonly used loss functions, however, have no perceptual basis. Some metrics are designed to be more perceptual, such as Google's Butteraugli. However, those metrics may not be suitable as a loss function because they are expensive to evaluate and non-differentiable.

Embodiments of the present invention use generative adversarial networks (GANs) for training a machine-learning based denoiser as an alternative to using a pre-defined loss function. There exists many types of GANs. A common feature of different types of GANs is that their training involves simultaneously optimizing two models: a generative model G that captures data distribution, and a discriminative model D that estimates the probability that a sample comes from the training data rather than G. The training procedure for G is to maximize the probability of D making a mistake.

As applied to denoising MC rendered images, the generative model may be a denoiser that produces denoised images from noisy input images, and the discriminative model may be a "discriminator" or "critic" that learns to distinguish the distribution of denoised images from the distribution of ground truth images. The denoiser is trained to make it harder for the discriminator to spot differences. Neural networks have shown to be able to achieve human-level image recognition capabilities, and may also be able to differentiate images as humans see. Such a training procedure may eliminate the need for carefully choosing a loss function, and may yield results that are sharper and more perceptually pleasing than those achieved with hand-picked loss functions.

The use of GANs in this context differs from the most common use case. GANs are mostly used for generative modelling, where the generator receives some pseudo-random noise, and is trained to transform it into data that follows the distribution of some training data. In the context of denoising MC render images, the generator has a more specific task of producing a denoised image that matches a noisy input image. In this context, the GAN can be considered as a conditional GAN, i.e., conditioned on some external information.

A. Generator

In some embodiments, the generator comprises a neural-network based denoiser as described above. The generator may include a convolutional neural network (CNN), a multilayer perceptron (MLP) neural network, a combination thereof, or other types of neural network according to various embodiments. The neural network may include a number of trainable parameters. The input to the generator may include a noisy image rendered by MC path tracing, and possibly also auxiliary rendering features such as surface normals, depth, and albedo. The output of the generator is an image that would, after the generator is trained, look like the ground truth corresponding to the input image. In some embodiments, the output image may be produced using kernel-prediction reconstruction as described above.

B. Discriminator

The discriminator may include a neural network that is parameterized by a number of trainable parameters. Similar to the generator, the discriminator may include a convolutional neural network (CNN), a multilayer perceptron (MLP) neural network, a combination thereof, or other types of neural network according to various embodiments. The discriminator may receive two classes of data as input: denoised images and ground truth images. The discriminator may be optimized to predict to which of these two classes a datum belongs. In the context of denoising, a denoised image should not only appear realistic, but should also correspond to the noisy input image. Thus, the discriminator may receive two pairs of data as input: (a noisy input image, a denoised image output by the generator) and (a noisy input image, a ground truth reference image). The discriminator's task is to compare a datum to the noisy input image, and determine whether the datum is the denoised image output by the generator or the ground-truth reference image.

Figure 13:
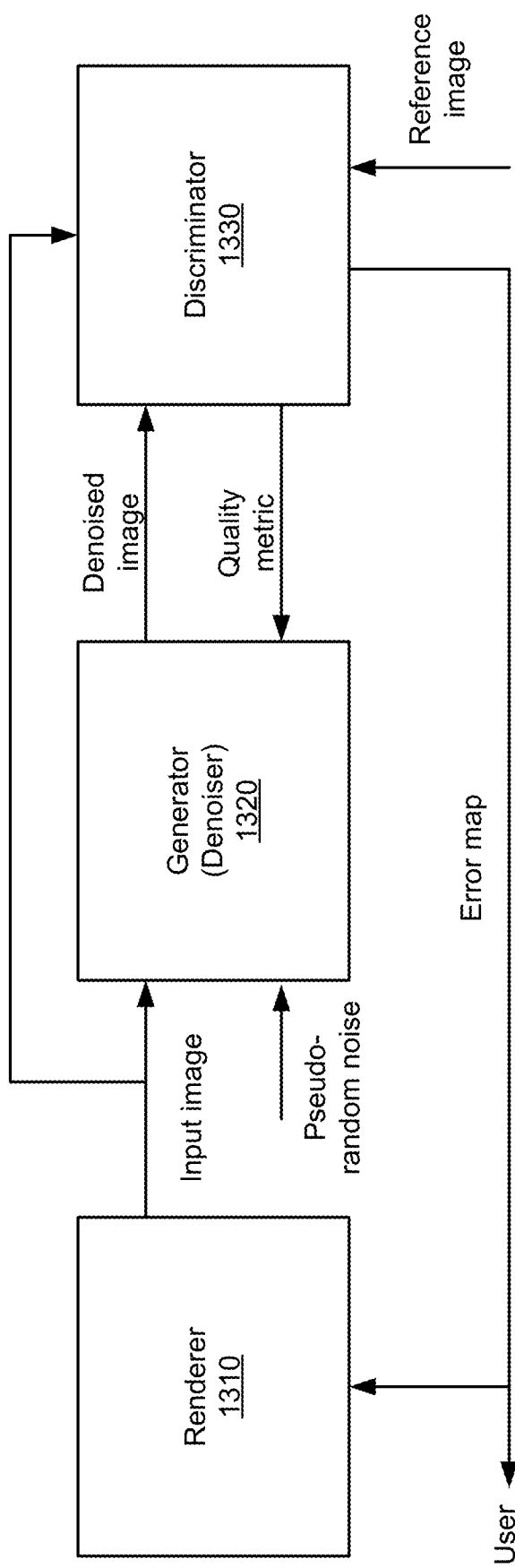
FIG. 13 illustrates system for denoising images rendered by MC path tracing based on generative adversarial networks according to some embodiments of the present invention.

FIG. 13 illustrates a GAN-based system for denoising images rendered by MC path tracing according to some embodiments. A noisy input image rendered by a renderer 1310 may be input into a generator 1320 and a discriminator 1330. The input may also include a set of auxiliary buffers (also referred herein as "feature buffers") that encode scene information, as well as their corresponding variances. The auxiliary buffers may include information about surface normal, albedo, depth, and the like. The generator 1320 may include a neural network configured to produce a corresponding denoised image as output. The neural network may be a MLP neural network, a CNN, a combination thereof, or the like according to various embodiments.

The denoised image output from the generator 1320 is input to the discriminator 1330. The discriminator 1330 also receives a corresponding reference image (i.e., the ground truth) as input. The reference image may be a high-quality image that has been rendered with many rays. It may be important that the ground truth image looks exactly like a desired output image. The generator 1320 may be trained to produce a mapping that resembles the mapping of the ground truth image. If the ground truth image contains some residual noise, the generator 1320 may be trained to transform a very noisy input image to an output image that contains the residual noise in the ground truth. In other words, the generator 1320 may be encouraged to inject undesirable residual noise into the denoised image. Therefore, the ground truth image should be of as high quality as possible. Since even high quality renderings may contain some residual noise, ground truth images may be created by denoising high quality renderings with an existing denoiser to remove the residue noise.

The discriminator 1330 may be configured to output a quality metric, which is input to the generator 1320. In some embodiments, the quality metric may be a number between 0 and 1, indicating the probability that the input image the discriminator 1330 receives belongs to the class of denoised images or the class of ground truth images. For example, a value of "0" may mean that it is highly probable that the input image belongs to the class of ground truth images, and a value of "1" may mean that it is highly probable that the input image belongs to the class of denoised images. In some other embodiments, the quality metric may be any real number that represents an "energy" assigned to the input image by the discriminator 1330. In this case, the discriminator 1330 may be trained to assign low energy to inputs it considers as belong to the class of ground truth images and high energy to inputs it considers as belonging to the class of denoised images. This type of GAN may be referred to as energy based GAN.

C. Training

The generator 1320 and discriminator 1330 may be trained jointly and in turns. Each of them may have its own optimization target, which can follow any of the common GAN objectives. In some embodiments, each of the generator 1320 and the discriminator 1330 may be optimized using a stochastic gradient descent training procedure.

FIGS. 14A and 14B illustrate exemplary procedures of training a GAN. The generator 1320 and the discriminator 1330 may be alternatingly trained. The parameters of the discriminator 1330 (i.e., the weights for the nodes in the discriminator network) may be fixed while the generator 1320 is being trained, as illustrated in FIG. 14A. Similarly, the parameters of the generator 1320 (i.e., the weights for the nodes in the generator network) may be fixed while the discriminator 1330 is being trained, as illustrated in FIG. 14B. For the first few iterations, both the discriminator 1330 and the generator 1320 may be pretty poor-performing networks, as they may be initialized with "random" weights. In a first iteration, the generator 1320 may be trained against the poor discriminator 1330. The now slightly less poor generator 1320 may be then "frozen" and the discriminator 1330 may be trained against it. In a next iteration, the discriminator 1330 may be frozen, and the generator 1320 may be trained against the slightly better discriminator 1330.

This back-and-forth process may be repeated many times, with the generator 1320 and the discriminator 1330 improving incrementally in each iteration. As the training converges, the generator 1320 may have learned to produce a high quality denoised image that looks very "real" and can fool the discriminator 1330 enough that the discriminator 1330 may have an equal probability of identifying it as belonging to the class of reference images and as belonging to the class of denoised images, such that a mean value of the quality metric approaches ½.

In some embodiments, the training may alternate between the generator 1320 and the discriminator 1330 with varying update steps for each of the generator 1320 and the discriminator to balance the convergence speed. For example, the training may alternate between the generator 1320 and the discriminator 1330 for every update step; that is, one update step for the generator 1320 and one update step for the discriminator 1330. As another example, the training may alternate between the generator 1320 and the discriminator 1330 for every three update steps for the generator 1320 and every one update step for the discriminator. As a further example, the training may alternate between the generator 1320 and the discriminator 1330 for every three update steps for the generator 1320 and every three update step for the discriminator.

In some embodiments, the generator 1320 may also use other error functions in conjunction the discriminator 1330 during training. For example, the generator 1320 may also use L1, L2 (i.e., mean square error or MSE), relative MSE (MrSE), peak signal-to-noise ratio (PSNR), mean absolute percentage error (MAPE), structural similarity index (SSIM), multiscale SSIM, or a combination thereof, for its training, where such errors may be determined using the reference image corresponding to the noisy input image. In some embodiments, the various error functions and the discriminator may be combined with relative weights.

Training of GANs can be notoriously unstable. For example, poor initialization of the generator 1320 and the discriminator 1330, or unbalanced optimization steps can result in divergence of either network. When both the generator 1320 and the discriminator 1330 perform poorly, they may not be able to learn much from each other, like two tennis novices playing each other. Using the same analogy, if neither players know the rules of the game, they may not improve from playing each other. In some cases, the generator 1320 or the discriminator 1330 may reach a local minimum of their loss function, where error gradients vanish causing the optimization is stuck. To improve the stability of the training, the generator 1320 and the discriminator 1330 may be "pre-trained" independently for a number of iterations before being trained jointly. For example, the generator 1320 may be pre-trained with a traditional loss function to make the generator 1320 somewhat "sensible." Similarly, the discriminator 1330 may be pre-trained until it starts to be able to distinguish between denoised images from ground truths. Then the generator 1320 and the discriminator 1330 may be optimized jointly in turns as described above.

In some further embodiments, the generator 1320 and the discriminator 1330 may be trained jointly and simultaneously as one system.

Figure 15:
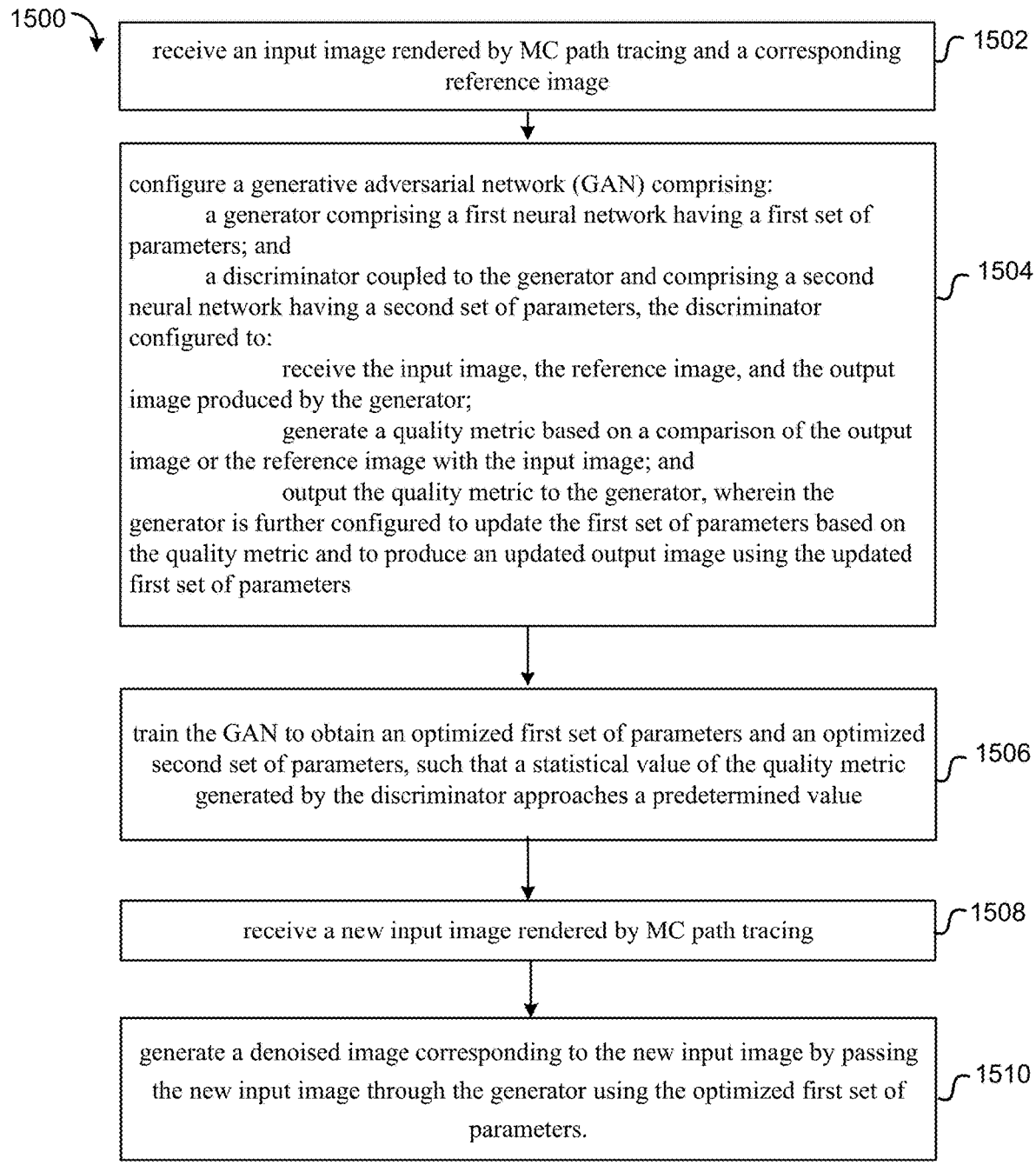
FIG. 15 is a flowchart illustrating a method of denoising images rendered by MC path tracing using a generative adversarial network according to some embodiments of the present invention.

FIG. 15 is a flowchart illustrating a method of denoising images rendered by MC path tracing using a generative adversarial network according to some embodiments.

At 1502, an input image rendered by MC path tracing and a corresponding reference image are received.

At 1504, a generative adversarial network (GAN) is configured. The GAN includes a generator and a discriminator coupled to the generator. The generator includes a first neural network that has a first set of parameters to be optimized. The generator may be configured to receive the input image and produce an output image corresponding to the input image using the first set of parameters. The discriminator includes a second neural network that has a second set of parameters to be optimized. The discriminator may be configured to receive the input image, the reference image, and the output image produced by the generator, and to generate a quality metric based on a comparison of the output image or the reference image with the input image using the second set of parameters, The quality metric may indicate a relative probability of the output image or the reference image belonging to a first class of denoised images as compared to a second class of ground truth images. The discriminator outputs the quality metric to the generator. The generator may be further configured to update the first set of parameters based on the quality metric and to produce an updated output image using the updated first set of parameters.

At 1506, the GAN is trained to obtain an optimized first set of parameters and an optimized second set of parameters, such that a statistical value of the quality metric generated by the discriminator approaches a predetermined value. In some embodiments, the quality metric may have a numerical value ranging from zero to one, and the predetermined value for the mean value of the quality metric may be about 0.5. In some other embodiments, the quality metric may be any real number. In some embodiments, the training may be performed by training the generator and the discriminator jointly and in turn, as described above. In some other embodiments, the training may be performed by training the generator and the discriminator jointly and simultaneously. Once the GAN has been trained, the generator may be used to denoise a new input image.

At 1508, a new input image rendered by MC path tracing may be received.

At 1510, a new denoised image corresponding to the new input image may be generated by passing the new input image through the generator using the optimized first set of parameters.

It should be appreciated that the specific steps illustrated in FIG. 15 provide a particular method of denoising images rendered by MC path tracing according to some embodiments. Other sequences of steps may also be performed according to alternative embodiments. For example, alternative embodiments may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

D. Adaptive Sampling

The generative adversarial nets framework may have several additional applications besides basic denoising functions. One application may be adaptive sampling. For example, as illustrated in FIG. 13, the discriminator 1330 may generate an error map showing the image qualities in different regions of an image. The discriminator 1330 may be trained to analyze different patches of an image (which itself may be part of a larger image) and assign a quality metric to each patch, and output an error map accordingly.

The error map can serve as a visual feedback for a user to judge the performance of the denoiser. If there are "hot spots" in the error map (e.g., regions with quality metric values lower than a threshold), the user may tell the renderer 1310 to render those regions with more rays. For instance, for an image of a human face, an error map may show hot spots in regions around the eyes. A user may then tell the renderer 1310 to render the regions around the eyes with more rays.

In some embodiments, the discriminator 1330 may provide the error map as an input to the renderer 1310, as illustrated in FIG. 13. The renderer 1310 may then render the regions corresponding to the hot spots with more rays and produce a new rendered image with better overall qualities. For example, the renderer 1310 may initially render all regions with 32 rays per pixel. After receiving the error map from the discriminator 1330, the renderer 1310 may render the regions corresponding to the hot spots with 64 rays per pixel, or other number of rays greater than 32. In some embodiments, the renderer 1310 may only need to re-render the regions corresponding to the hot spots with more rays, and can reuse the previously rendered image for other regions.

In some other embodiments, the input to the generator 1320 may also include some pseudo-random noise to be superimposed on the noisy input image, as illustrated in FIG. 13. With the addition of the pseudo-random noise the input image, the generator 1320 may produce multiple different denoised images for the same noisy input image, and therefore may capture a full conditional distribution of the denoised images for a given noisy input image. This may be useful for adaptive sampling. For instance, a user may tell the renderer 1310 to render the regions where the distribution is broad with more rays.

E. Upsampling

In some other embodiments, the generator may be trained for upsampling a lower resolution image to a higher resolution image. For example, an input image may have 1000×1000 pixels. The generator may be trained to produce an image that has 4000×4000 pixels based on the 1000×1000 pixel input image. In the case of denoising, the input picture may have full pixel resolutions, but have poor color qualities for all pixels; and the generator may be trained to produce a low-noise image from the noisy image. In the case of upsampling, the input image may have fewer number of pixels, but have high color qualities for all pixels; the generator may be trained to produce a high resolution image from the low-resolution image while maintaining the color qualities.

The input images can be either a rendered image, or a natural image such as a photograph. Rendered images can have very high dynamic ranges (HDR), whereas natural images usually have bounded dynamic ranges. In embodiments where the input images are rendered images, the generator may use feature buffers, such as surface normal, albedo, depth, and the like, to aid the training process. In contrast, natural images normally only has color data, and feature buffers are usually not available. In some embodiments, a renderer may generate both colors and feature buffers at low resolutions. In some other embodiments, a renderer may generate color buffers only at a low resolution, and feature buffers at both a low resolution and a high resolution. A renderer can usually generate feature buffers at a high resolution using relatively little computing resources as compared to generating colors.

In some embodiments, upsampling can be applied temporally. For example, the input may be a series of image frames of a video. The generator may be trained to create new image frames interspersed with the input frames, so that the upsampled series of image frames progresses more smoothly from one frame to the next.

In some further embodiments, upsampling may be performed using a neural network that is trained by using importance sampling, as described above.

VIII. Example Systems

Figure 16:
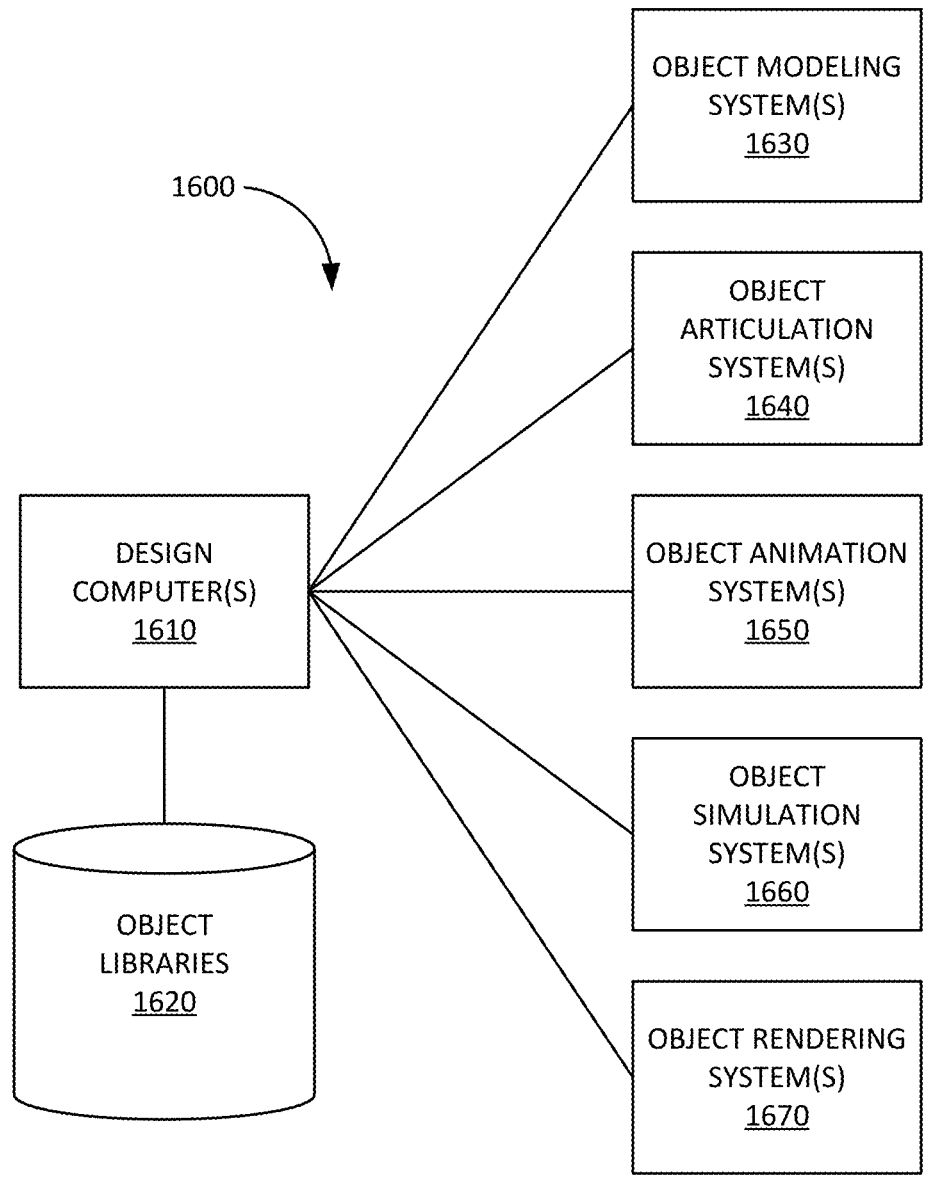
FIG. 16 is a simplified block diagram of system for creating computer graphics imagery (CGI) and computer-aided animation that may implement or incorporate various embodiments.

FIG. 16 is a simplified block diagram of system 1600 for creating computer graphics imagery (CGI) and computer-aided animation that may implement or incorporate various embodiments. In this example, system 1600 can include one or more design computers 1610, object library 1620, one or more object modeler systems 1630, one or more object articulation systems 1640, one or more object animation systems 1650, one or more object simulation systems 1660, and one or more object rendering systems 1670. Any of the systems 1630-870 may be invoked by or used directly by a user of the one or more design computers 1610 and/or automatically invoked by or used by one or more processes associated with the one or more design computers 1610. Any of the elements of system 1600 can include hardware and/or software elements configured for specific functions.

The one or more design computers 1610 can include hardware and software elements configured for designing CGI and assisting with computer-aided animation. Each of the one or more design computers 1610 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1610 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1610 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1610 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1610 acting as an animator may employ one or more systems or tools to specify motion and position of one or more objects over time to produce an animation.

Object library 1620 can include elements configured for storing and accessing information related to objects used by the one or more design computers 1610 during the various stages of a production process to produce CGI and animation. Some examples of object library 1620 can include a file, a database, or other storage devices and mechanisms. Object library 1620 may be locally accessible to the one or more design computers 1610 or hosted by one or more external computer systems.

Some examples of information stored in object library 1620 can include an object itself, metadata, object geometry, object topology, rigging, control data, animation data, animation cues, simulation data, texture data, lighting data, shader code, or the like. An object stored in object library 1620 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1630 can include hardware and/or software elements configured for modeling one or more objects. Modeling can include the creating, sculpting, and editing of an object. In various embodiments, the one or more object modeling systems 1630 may be configured to generate a model to include a description of the shape of an object. The one or more object modeling systems 1630 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1630 may further generate model data (e.g., 2D and 3D model data) for use by other elements of system 1600 or that can be stored in object library 1620. The one or more object modeling systems 1630 may be configured to allow a user to associate additional information, metadata, color, lighting, rigging, controls, or the like, with all or a portion of the generated model data.

The one or more object articulation systems 1640 can include hardware and/or software elements configured to articulating one or more computer-generated objects. Articulation can include the building or creation of rigs, the rigging of an object, and the editing of rigging. In various embodiments, the one or more articulation systems 1640 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1640 may further generate articulation data (e.g., data associated with controls or animations variables) for use by other elements of system 1600 or that can be stored in object library 1620. The one or more object articulation systems 1640 may be configured to allow a user to associate additional information, metadata, color, lighting, rigging, controls, or the like, with all or a portion of the generated articulation data.

The one or more object animation systems 1650 can include hardware and/or software elements configured for animating one or more computer-generated objects. Animation can include the specification of motion and position of an object over time. The one or more object animation systems 1650 may be invoked by or used directly by a user of the one or more design computers 1610 and/or automatically invoked by or used by one or more processes associated with the one or more design computers 1610.

In various embodiments, the one or more animation systems 1650 may be configured to enable users to manipulate controls or animation variables or utilized character rigging to specify one or more key frames of animation sequence. The one or more animation systems 1650 generate intermediary frames based on the one or more key frames.

In some embodiments, the one or more animation systems 1650 may be configured to enable users to specify animation cues, paths, or the like according to one or more predefined sequences. The one or more animation systems 1650 generate frames of the animation based on the animation cues or paths. In further embodiments, the one or more animation systems 1650 may be configured to enable users to define animations using one or more animation languages, morphs, deformations, or the like.

The one or more object animation systems 1650 may further generate animation data (e.g., inputs associated with controls or animation variables) for use by other elements of system 1600 or that can be stored in object library 1620. The one or more object animation systems 1650 may be configured to allow a user to associate additional information, metadata, color, lighting, rigging, controls, or the like, with all or a portion of the generated animation data.

The one or more object simulation systems 1660 can include hardware and/or software elements configured for simulating one or more computer-generated objects. Simulation can include determining motion and position of an object over time in response to one or more simulated forces or conditions. The one or more object simulation systems 1660 may be invoked by or used directly by a user of the one or more design computers 1610 and/or automatically invoked by or used by one or more processes associated with the one or more design computers 1610.

In various embodiments, the one or more object simulation systems 1660 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1660 may be used to simulate the behavior of objects, such as hair, fur, and cloth, in response to a physics model and/or animation of one or more characters and objects within a computer-generated scene.

The one or more object simulation systems 1660 may further generate simulation data (e.g., motion and position of an object over time) for use by other elements of system 1600 or that can be stored in object library 1620. The generated simulation data may be combined with or used in addition to animation data generated by the one or more object animation systems 1650. The one or more object simulation systems 1660 may be configured to allow a user to associate additional information, metadata, color, lighting, rigging, controls, or the like, with all or a portion of the generated simulation data.

The one or more object rendering systems 1670 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1670 may be invoked by or used directly by a user of the one or more design computers 1610 and/or automatically invoked by or used by one or more processes associated with the one or more design computers 1610. One example of a software program embodied as the one or more object rendering systems 1670 can include PhotoRealistic RenderMan, or PRMan, produced by Pixar Animations Studios of Emeryville, Calif.

In various embodiments, the one or more object rendering systems 1670 can be configured to render one or more objects to produce one or more computer-generated images or a set of images over time that provide an animation. The one or more object rendering systems 1670 may generate digital images or raster graphics images.

In various embodiments, a rendered image can be understood in terms of a number of visible features. Some examples of visible features that may be considered by the one or more object rendering systems 1670 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air), shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1670 may further render images (e.g., motion and position of an object over time) for use by other elements of system 1600 or that can be stored in object library 1620. The one or more object rendering systems 1670 may be configured to allow a user to associate additional information or metadata with all or a portion of the rendered image.

Figure 17:
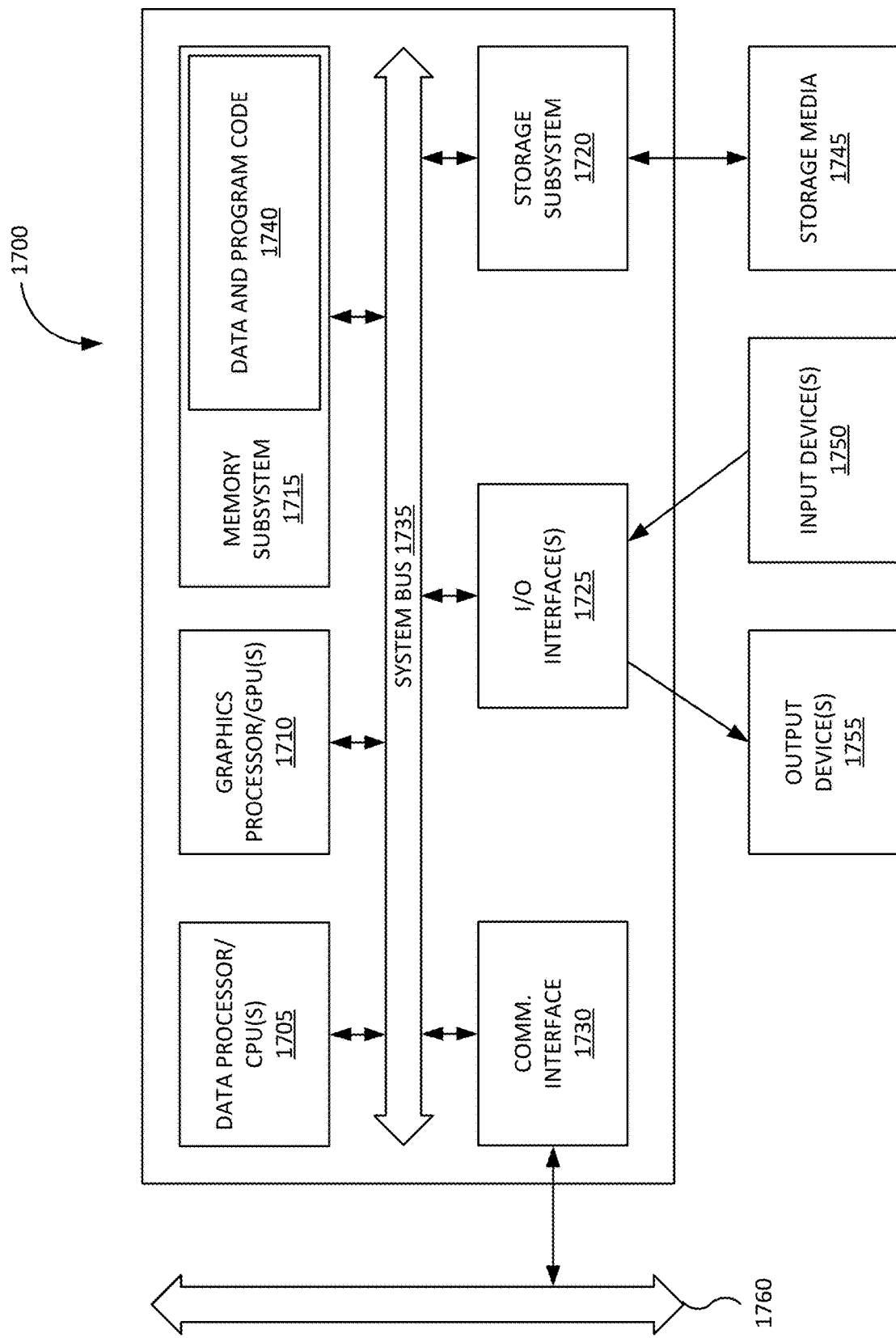
FIG. 17 is a block diagram of a computer system according to some embodiments of the present invention.

FIG. 17 is a block diagram of computer system 1700. FIG. 17 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1700 and any of its components or subsystems can include hardware and/or software elements configured for performing methods described herein.

Computer system 1700 may include familiar computer components, such as one or more data processors or central processing units (CPUs) 1705, one or more graphics processors or graphical processing units (GPUs) 1710, memory subsystem 1715, storage subsystem 1720, one or more input/output (I/O) interfaces 1725, communications interface 1730, or the like. Computer system 1700 can include system bus 1735 interconnecting the above components and providing functionality, such connectivity as inter-device communication.

The one or more data processors or central processing units (CPUs) 1705 can execute logic or program code or for providing application-specific functionality. Some examples of CPU(s) 1705 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1710 can execute logic or program code associated with graphics or for providing graphics-specific functionality. GPUs 1710 may include any conventional graphics processing unit, such as those provided by conventional video cards. In various embodiments, GPUs 1710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1710 may include any number of registers, logic units, arithmetic units, caches, memory interfaces, or the like.

Memory subsystem 1715 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1715 can include data and program code 1740.

Storage subsystem 1720 can also store information using machine-readable articles, information storage devices, or computer-readable storage media. Storage subsystem 1720 may store information using storage media 1745. Some examples of storage media 1745 used by storage subsystem 1720 can include floppy disks, hard disks, optical storage media such as CD-ROMS, DVDs and bar codes, removable storage devices, networked storage devices, or the like. In some embodiments, all or part of data and program code 1740 may be stored using storage subsystem 1720.

The one or more input/output (I/O) interfaces 1725 can perform I/O operations. One or more input devices 1750 and/or one or more output devices 1755 may be communicatively coupled to the one or more I/O interfaces 1725. The one or more input devices 1750 can receive information from one or more sources for computer system 1700. Some examples of the one or more input devices 1750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1750 may allow a user of computer system 1700 to interact with one or more non-graphical or graphical user interfaces to enter a comment, select objects, icons, text, user interface widgets, or other user interface elements that appear on a monitor/display device via a command, a click of a button, or the like.

The one or more output devices 1755 can output information to one or more destinations for computer system 1700. Some examples of the one or more output devices 1755 can include a printer, a fax, a feedback device for a mouse or joystick, external storage systems, a monitor or other display device, a communications interface appropriately configured as a transceiver, or the like. The one or more output devices 1755 may allow a user of computer system 1700 to view objects, icons, text, user interface widgets, or other user interface elements. A display device or monitor may be used with computer system 1700 and can include hardware and/or software elements configured for displaying information.

Communications interface 1730 can perform communications operations, including sending and receiving data. Some examples of communications interface 1730 may include a network communications interface (e.g. Ethernet, Wi-Fi, etc.). For example, communications interface 1730 may be coupled to communications network/external bus 1760, such as a computer network, a USB hub, or the like. A computer system can include multiple of the same components or subsystems, e.g., connected together by communications interface 1730 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1700 may also include one or more applications (e.g., software components or functions) to be executed by a processor to execute, perform, or otherwise implement techniques disclosed herein. These applications may be embodied as data and program code 1740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1715 and/or storage subsystem 1720.

Such programs may also be encoded and transmitted using carrier signals adapted for transmission via wired, optical, and/or wireless networks conforming to a variety of protocols, including the Internet. As such, a computer readable medium according to examples described herein may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of this disclosure. However, other embodiments of the disclosure herein may be directed to specific embodiments relating to each individual aspect, or specific combinations of these individual aspects.

The above description of exemplary embodiments of this disclosure have been presented for the purposes of illustration and description. It is not intended to be exhaustive or to limit this disclosure to the precise form described, and many modifications and variations are possible in light of the teaching above. The embodiments were chosen and described in order to best explain the principles of this disclosure and its practical applications to thereby enable others skilled in the art to best utilize this disclosure in various embodiments and with various modifications as are suited to the particular use contemplated.

A recitation of "a," "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of denoising images rendered by Monte Carlo (MC) path tracing, the method comprising:
    receiving a set of input images rendered by MC path tracing and a set of reference images, each reference image corresponding to a respective input image;
    configuring a neural network comprising:
        an input layer configured to receive the set of input images;
        a plurality of hidden layers, each hidden layer having a respective number of nodes, each node associated with a respective parameter, a first layer of the plurality of hidden layers coupled to the input layer; and
        an output layer coupled to a last layer of the plurality of hidden layers and configured to output a respective denoised image corresponding to a respective input image;
    training the neural network using the set of input images and the set of reference images, the training comprising:
        obtaining one or more image metrics for each respective input image of the set of input images or for a reference image corresponding to the respective input image;
        selecting a first input image among the set of input images according to a probability function based on the one or more image metrics;
        performing a first iteration of the training using the first input image and a corresponding first reference image to obtain a first intermediate set of parameters associated with the nodes of the plurality of hidden layers;
        selecting additional input images among the set of input images according to the probability function; and
        performing additional iterations of the training using each of the additional input images and a corresponding reference image to obtain a final set of parameters associated with the nodes of the plurality of hidden layers;
    receiving a new input image rendered by MC path tracing; and
    generating a new denoised image corresponding to the new input image by passing the new input image through the neural network using the final set of parameters.

2. The method of claim 1, wherein the one or more image metrics relate to one or more of average pixel color variance within the respective input image, variance of surface normals within the respective input image, presence of edges within the respective input image, or variance of effective diffuse irradiance within the respective input image.

3. The method of claim 2, wherein each input image of the set of input images includes one or more auxiliary buffers output by a renderer, and wherein the one or more image metrics are obtained from the one or more auxiliary buffers.

4. The method of claim 2, wherein the one or more image metrics are obtained by analyzing each of the set of input images using an image analysis algorithm.

5. The method of claim 1, wherein the training of the neural network further comprises:
    for each iteration of the training:
        passing a respective input image through the neural network to obtain an intermediate denoised image;
        comparing the intermediate denoised image to a corresponding reference image to obtain a gradient of a loss function for each pixel; and
        back-propagating the gradient of the loss function through the neural network to obtain an updated set of parameters associated with the nodes of the plurality of hidden layers.

6. The method of claim 5, further comprising:
    normalizing the gradient of the loss function by the probability function.

7. The method of claim 6, wherein normalizing the gradient of the loss function comprises dividing the gradient of the loss function by the probability function.

8. The method of claim 1, wherein each input image of the set of input images is rendered with a first number of samples per pixel, each reference image of the set of reference images is rendered by MC path tracing with a second number of samples per pixel greater than the first number of samples per pixel.

9. The method of claim 1, wherein the neural network comprises a convolutional neural network.

10. The method of claim 1, wherein the neural network comprises a multilayer perceptron neural network.

11. A method of denoising images rendered by Monte Carlo (MC) path tracing, the method comprising:
    receiving a set of input images rendered by MC path tracing and a set of reference images, each reference image corresponding to a respective input image;
    configuring a neural network comprising:
        an input layer configured to receive the set of input images;
        a plurality of hidden layers, each hidden layer having a respective number of nodes, each node associated with a respective parameter, a first layer of the plurality of hidden layers coupled to the input layer; and
        an output layer coupled to a last layer of the plurality of hidden layers, the output layer configured to output a respective denoised image corresponding to a respective input image;
    training the neural network using the set of input images and the set of reference images, the training comprising:

performing one or more initial iterations of the training by randomly sampling the set of input images using a uniform probability to obtain a set of intermediate denoised images, each intermediate denoised image corresponding to a respective input image;

for each respective input image, evaluating an error gradient by comparing a corresponding intermediate denoised image to the respective input image; and performing one or more additional iterations of the training by sampling the set of input images according to a probability function based on the error gradient of each input image of the set of input images to obtain a set of optimized parameters associated with the nodes of the plurality of hidden layers;

receiving a new input image rendered by MC path tracing; and generating a new denoised image corresponding to the new input image by passing the new input image through the neural network using the set of optimized parameters.

12. The method of claim 11, wherein the probability function is proportional to the error gradient of each input image.

13. The method of claim 12, further comprising normalizing the error gradient by dividing the error gradient by the probability function.

14. The method of claim 11, wherein each of the set of input images is rendered with a first number of samples per pixel, each of the set of reference images is rendered by MC path tracing with a second number of samples per pixel greater than the first number of samples per pixel.

15. The method of claim 11, wherein the neural network comprises a convolutional neural network or a multilayer perceptron neural network.

16. A method of denoising images rendered by Monte Carlo (MC) path tracing, the method comprising:

receiving a set of input images rendered by MC path tracing and a set of reference images, each reference image corresponding to a respective input image;

configuring a neural network comprising:
  an input layer configured to receive the set of input images;
  a plurality of hidden layers, each hidden layer having a respective number of nodes, each node associated with a respective parameter, a first layer of the plurality of hidden layers coupled to the input layer; and
  an output layer coupled to a last layer of the plurality of hidden layers, the output layer configured to output a respective denoised image corresponding to a respective input image;

training the neural network using the set of input images and the set of reference images, the training comprising:
  assigning a relevance score to each respective input image of the set of input images, the relevance score indicating a degree of relevance to one or more areas of interests; and
  performing the training by sampling the set of input images according to a probability function that is proportional to the relevance score of each respective input image to obtain a set of optimized parameters associated with the nodes of the plurality of hidden layers;

receiving a new input image rendered by MC path tracing; and generating a denoised image corresponding to the new input image by passing the new input image through the neural network using the set of optimized parameters.

17. The method of claim 16, wherein the one or more areas of interests relate to one or more of presence of hair, presence of a face, or presence of a character in the respective input image.

18. The method of claim 16, wherein the neural network comprises a convolutional neural network.

19. The method of claim 16, wherein the neural network comprises a multilayer perceptron neural network.

20. The method of claim 16, wherein each input image of the set of input images is rendered with a first number of samples per pixel, each reference image of the set of reference images is rendered by MC path tracing with a second number of samples per pixel greater than the first number of samples per pixel.

* * * * *